United States Patent [19]
Wong et al.

[11] Patent Number: 4,553,474
[45] Date of Patent: Nov. 19, 1985

[54] AIRCRAFT CABIN PRESSURIZATION SYSTEM

[75] Inventors: Paul P. Wong, Rancho Palos Verdes; John B. Lippold, Huntington Beach; Glenn A. Burgess, Downey, all of Calif.

[73] Assignee: The Garrett Corporation, Los Angeles, Calif.

[21] Appl. No.: 325,089

[22] Filed: Nov. 25, 1981

[51] Int. Cl.$^4$ ............................................. B64D 13/04
[52] U.S. Cl. ........................................................ 98/1.5
[58] Field of Search ............................................ 98/1.5

[56] References Cited

U.S. PATENT DOCUMENTS

| | | | |
|---|---|---|---|
| Re. 23,536 | 8/1952 | Del Mar | 98/1.5 |
| 2,407,257 | 9/1946 | Del Mar | 98/1.5 |
| 2,873,661 | 2/1959 | Fischer | 98/1.5 |
| 2,973,702 | 3/1961 | Andresen, Jr. | 98/1.5 |
| 2,983,211 | 5/1961 | Andressen, Jr. | 98/1.5 |
| 3,053,162 | 9/1962 | Andresen, Jr. | 98/1.5 |
| 3,141,399 | 7/1964 | Andresen, Jr. | 98/1.5 |
| 3,152,534 | 10/1964 | Molloy et al. | 98/1.5 |
| 3,373,675 | 3/1968 | Best | 98/1.5 |
| 3,376,803 | 4/1968 | Emmons | 98/1.5 |
| 3,450,020 | 6/1969 | Andresen, Jr. | 98/1.5 |
| 3,453,945 | 7/1969 | Andresen, Jr. | 98/1.5 |
| 3,461,790 | 8/1969 | Kinsell et al. | 98/1.5 |
| 3,485,161 | 12/1969 | Kemper | 98/1.5 |
| 3,577,902 | 5/1971 | Gardner | 98/1.5 |
| 3,728,955 | 4/1973 | Ricaud | 98/1.5 |
| 4,164,898 | 8/1979 | Burgess et al. | 98/1.5 |
| 4,164,899 | 8/1979 | Burgess | 98/1.5 |

*Primary Examiner*—Harold Joyce
*Attorney, Agent, or Firm*—Leslie S. Miller; John H. Lynn; Albert J. Miller

[57] ABSTRACT

This invention controls the air pressure in an aircraft cabin in response to a selected landing field altitude and to a selected maximum permissible cabin pressure rate.

29 Claims, 26 Drawing Figures

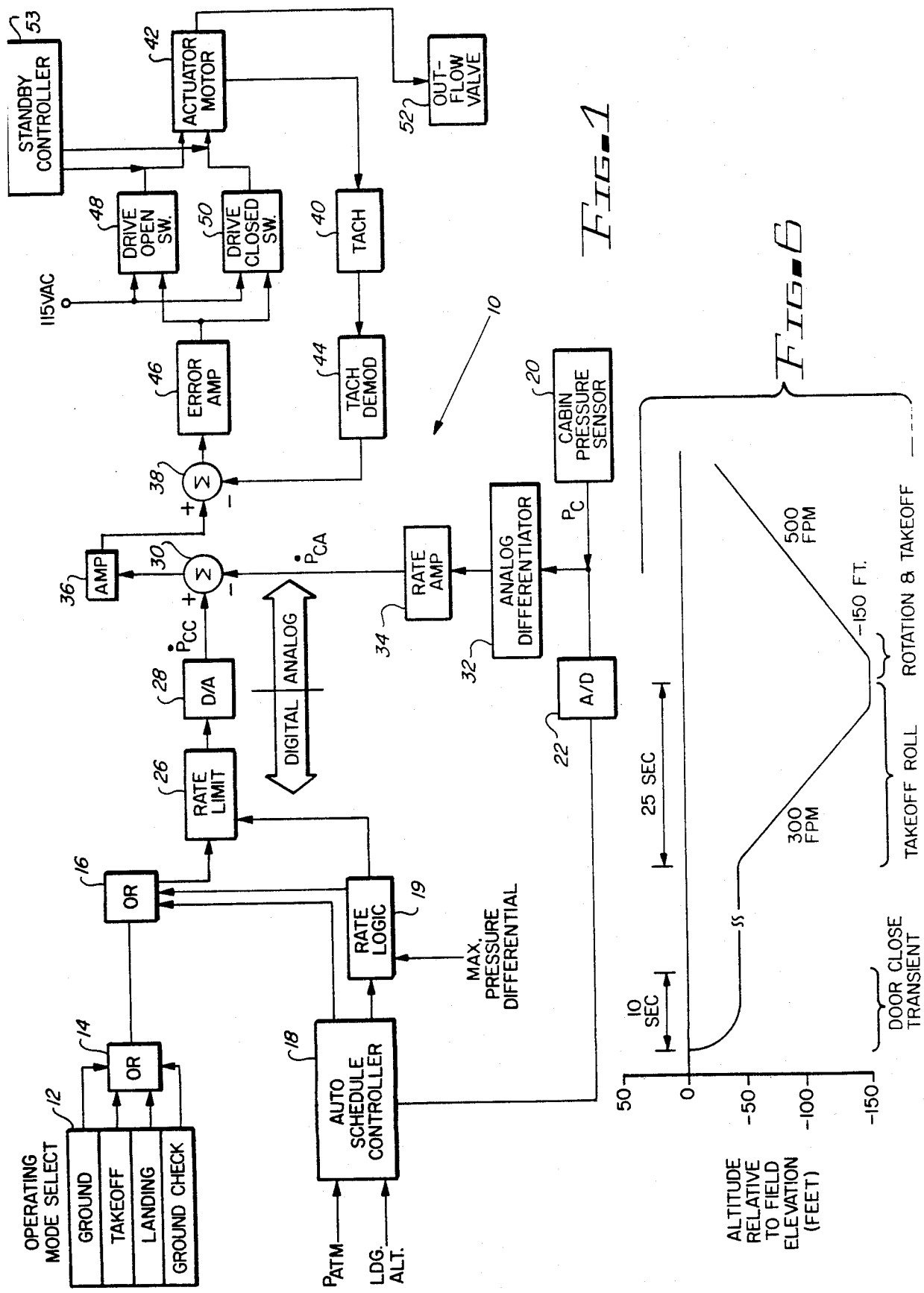

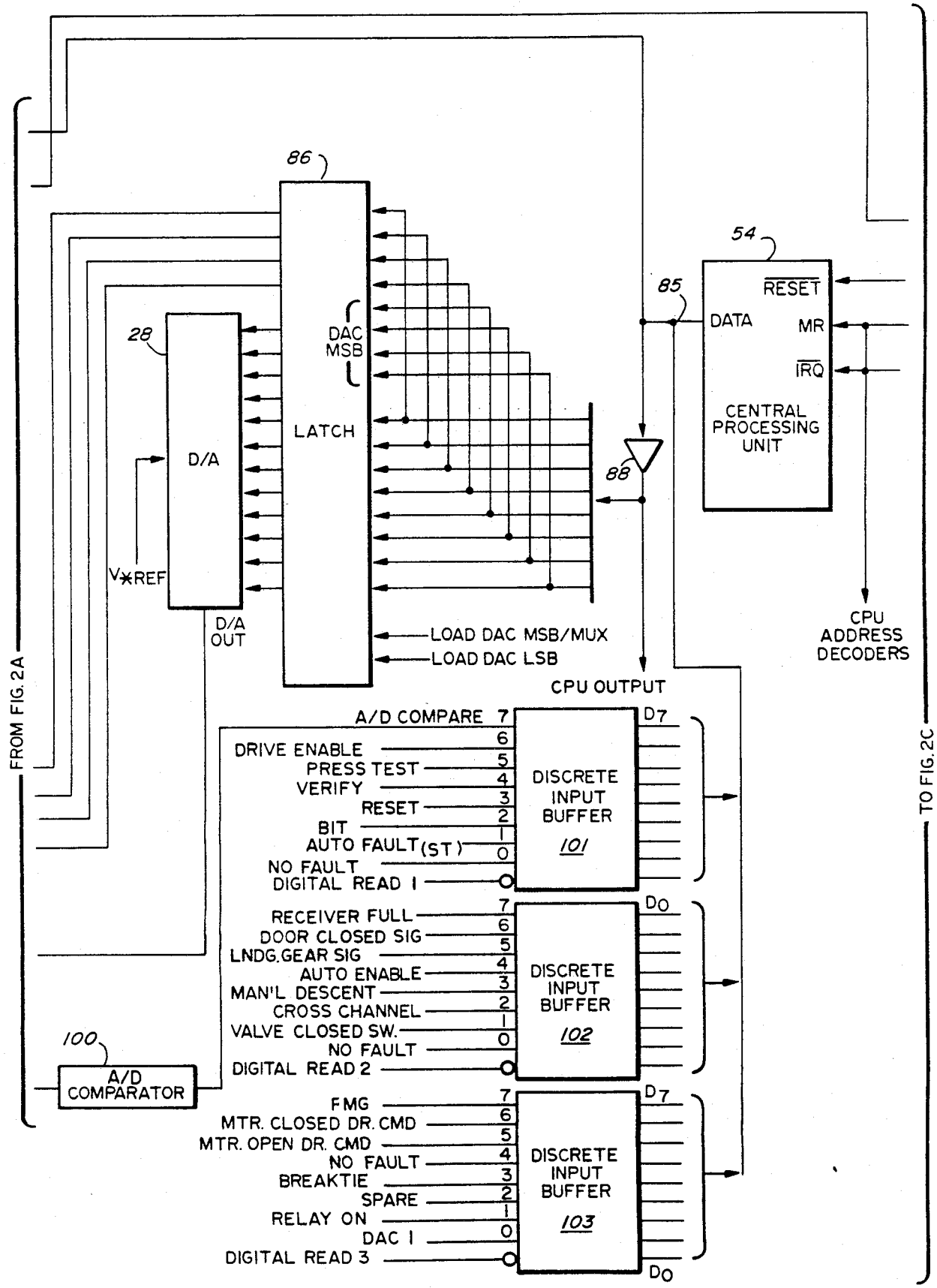
FIG_2B

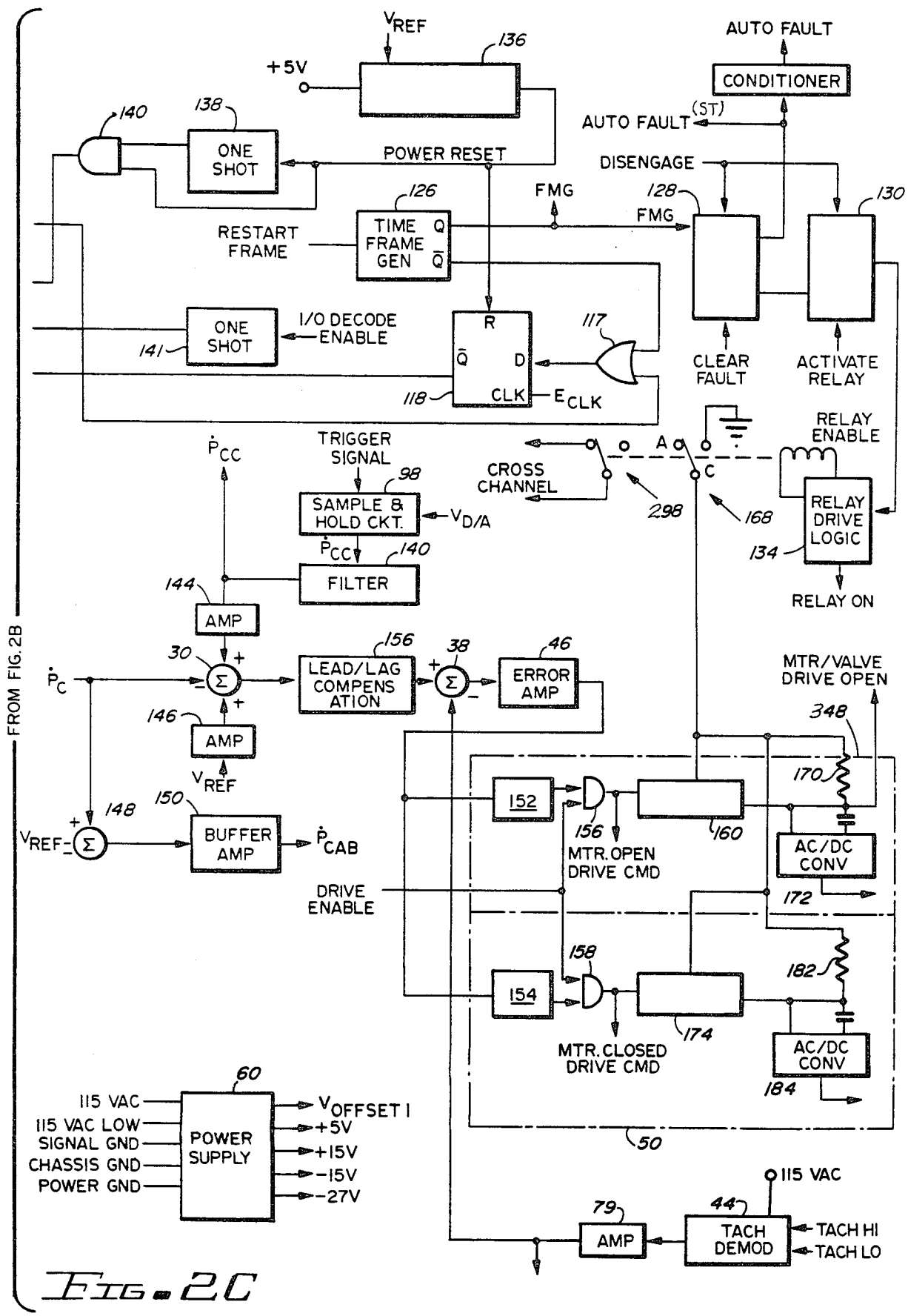

AIRCRAFT CABIN PRESSURIZATION SYSTEM

BACKGROUND OF THE INVENTION

The present invention relates to systems for controlling the air pressure within an enclosure, such as an aircraft cabin. This invention, which controls the air pressure in such an enclosure to ensure passenger comfort and safety, includes digital systems for monitoring and testing system components to provide fail-safe operation.

Control of aircraft cabin air pressure is important for both the comfort of passengers and crew and safe aircraft operation. Many present-day aircraft fly at elevations of 35,000 feet or higher; and the cabin air pressure control system for such aircraft must provide adequate oxygen to occupants of the aircraft without permitting sudden changes in the cabin air pressure, to which the human ear is sensitive, and without developing a dangerously high pressure differential between the cabin air pressure and the ambient pressure to prevent overstressing of the structural components of the aircraft.

Some prior art cabin pressurization systems have the disadvantage that a member of the flight crew must periodically compare the rate of change of the cabin altimeter reading, which is related to the cabin air pressure, to the rate of change of the aircraft altimeter to ascertain whether the system is functioning properly. Many prior art cabin pressurization systems determine the cabin air pressure based upon a setting of the take-off altitude, the cruise altitude and the landing field altitude above sea level; but, under certain atmospheric conditions, such systems permit rapid changes in aircraft cabin pressure, which often causes discomfort to the passengers and crew due to the sensitivity of the human ear to changes in air pressure.

Prior art aircraft pressurization systems have the added deficiency of failing to provide built-in monitoring and testing of subsystems and flight data which designers of modern aircraft require to ensure reliable operation and to minimize risks in the event of system failure.

Accordingly, there is a need in the art for an aircraft cabin pressurization system which requires minimal attention from the crew, maintains constant pressure under adverse atmospheric conditions and sudden, small changes in aircraft altitude, and which includes means for monitoring and testing critical components within the system to ensure safe, reliable operation.

SUMMARY OF THE INVENTION

This invention overcomes the deficiencies of prior art cabin pressurization systems and provides a system which meets the safety, reliability and human comfort standards for modern aircraft. The only required manual inputs to the system are selections of landing field altitude and maximum rate of change of cabin air pressure prior to take-off. The system requires no in-flight changes unless the landing destination is changed. An aircraft cabin pressurization system according to the present invention maximizes passenger comfort since the system maintains low rates of cabin pressure change without regard to changes in aircraft altitude and ambient pressure. The system logic is self-adapting to the aircraft flight profile to prohibit exposure of the aircraft crew and passengers to low-pressure effects of high cabin altitudes.

The invention includes a cruise altitude control to allow apparent cabin altitude to remain constant during cruising conditions with atmospheric altitude variations of up to plus or minus 500 feet. When the cruise altitude controller senses that the aircraft altitude change is within selected limits, the system clamps to a scheduled value of cabin altitude, which becomes the commanded cabin altitude. The apparent cabin altitude remains constant regardless of aircraft altitude change due to turbulence, variations in ambient air pressure, etc., until the aircraft has climbed or descended a predetermined height from the altitude at which the cruise control was imposed or until the difference between the cabin pressure and the ambient pressure reaches a predetermined limit. If the aircraft cruise altitude drifts beyond the predetermined limits, the cruise altitude controller unclamps; and the cabin pressure climbs or descends at a controlled rate to the scheduled value for the new altitude.

BRIEF DESCRIPTION OF THE DRAWINGS

FIG. 1 is a simplified block diagram of an aircraft cabin pressurization system according to the present invention;

FIGS. 2A–2C are detailed block diagrams of the invention;

FIG. 5 is a graph of a schedule of cabin altitude versus aircraft altitude;

DESCRIPTION OF THE PREFERRED EMBODIMENT

Figure 2A:
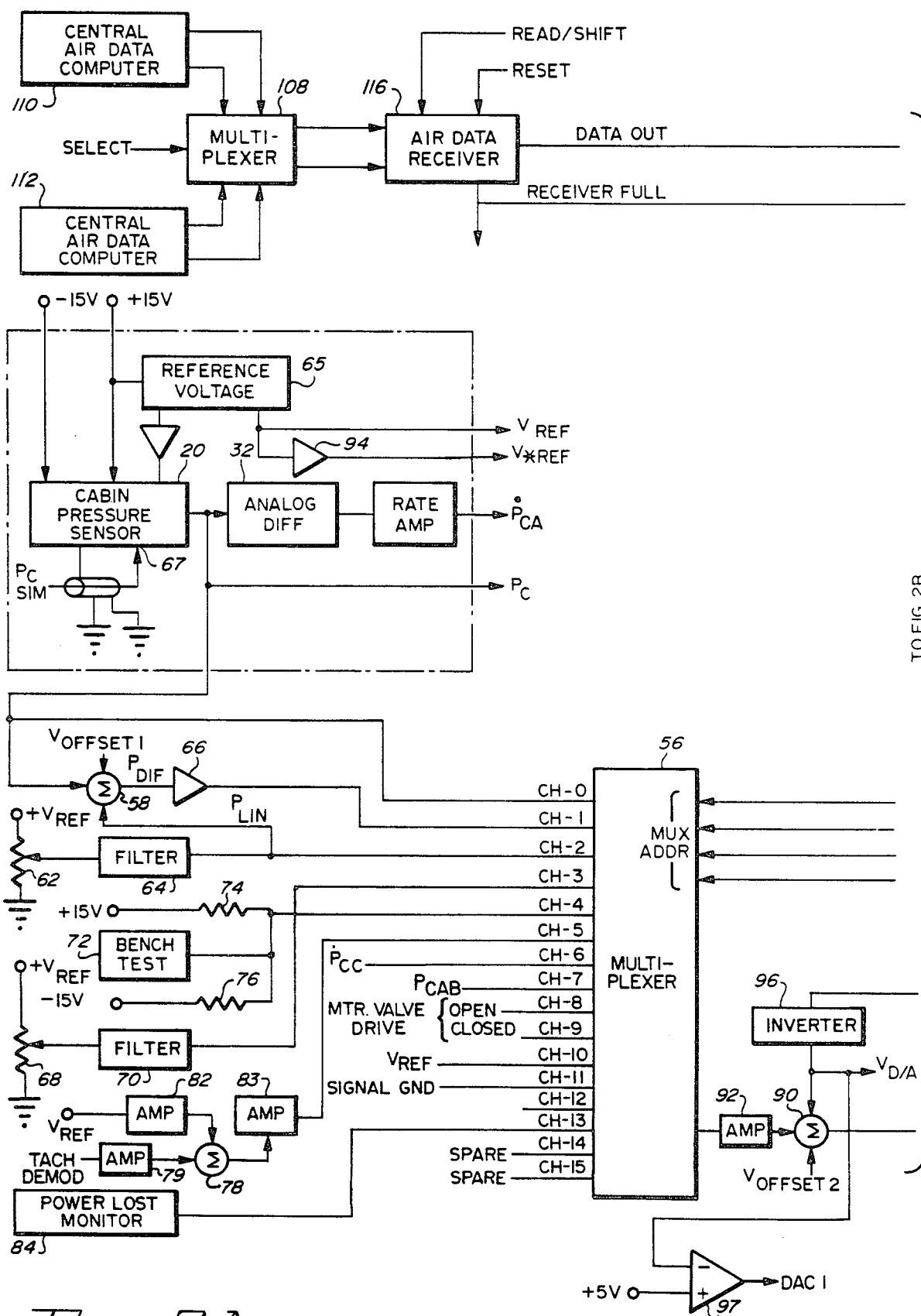

Referring to FIG. 1, an aircraft pressurization system 10 according to the invention includes an operating mode selector 12, which supplies signals indicative of aircraft operations on the ground prior to takeoff, during takeoff, during landing, and a ground check after landing to an OR gate 14, which outputs a signal to an OR gate 16 upon receipt of a signal from operating mode selector 12. The automatic mode of operation includes an autoschedule controller 18, which outputs signals to OR gate 16 for controlling the cabin air pressure as a function of the ambient atmospheric pressure, the landing altitude, and the actual cabin air pressure. A cabin pressure sensor 20 outputs a signal $P_C$ indicative of the actual cabin air pressure to autoschedule controller 18 through an analog to-digital converter 22. Rate logic circuit 19 receives an input indicative of the maximum allowable pressure differential between the ambient atmospheric pressure and the actual cabin pressure in addition to receiving a signal from autoschedule controller 18. Rate logic circuit 19 provides outputs to OR gate 16 and to a rate limit circuit 26 which also receives an input from OR gate 16. The output signal of rate logic circuit 19 indicates either the actual differential between the cabin pressure and the ambient pressure or the maximum permissible differential therebetween. Rate limit circuit 26 computes the commanded rate of change of cabin pressure for the particular aircraft operating mode indicated by operating mode selector 12. A digital-to-analog converter 28 receives the digital output signal of rate limit circuit 26 and inputs an analog signal $\dot{P}_{CC}$ indicative of the commanded rate of change of cabin pressure to a summing circuit 30. An analog differentiator 32 connected to output $P_C$ of cabin pressure sensor 20 differentiates the actual cabin pressure and provides a signal indicative of the actual rate of change of cabin pressure to a rate amplifier 34, which supplies a signal $\dot{P}_{CA}$ indicative of the actual rate of change of cabin pressure to summing circuit 30. Summing circuit 30 outputs a signal indicative of the difference between commanded rate of change of cabin pressure and the actual rate of change of cabin pressure to an amplifier 36, which provides an input signal to a summing circuit 38.

A tachometer 40 provides a signal indicative of the speed of an actuator motor 42 to summing circuit 38 through a tachometer demodulator circuit 44. An error amplifier 46 amplifies the output of summing circuit 38 and outputs a signal for driving actuator motor 42 through either a drive open switch 48 or a drive closed switch 50 with sign of the error determining whether error amplifier 46 actuates drive open switch 48 or drive closed switch 50. Actuator motor 42 controls a valve 52 to determine the rate at which air flows from the aircraft cabin, thereby controlling the cabin air pressure.

If a failure occurs in the above-described circuitry, a standby controller 53, having structure identical to the foregoing described circuitry assumes control of actuator motor 42.

FIG. 2 block diagram indicates input and output signals from a central processing unit 54 used to control the operation of valve 52 (not shown in FIG. 2). Cabin pressure sensor 20, which receives +15 volt and −15 volt inputs from a power supply 60, senses the cabin pressure and outputs a signal $P_C$ indicative thereof to channel zero of an analog multiplexer 56, which receives a plurality of analog signals which are selectively converted into digital form and input to central processing unit 54 for processing thereby. The output signal $P_C$ of cabin pressure sensor 20 is also connected to a first input of a summer 58. A second input of summer 58 receives an offset voltage VOFFSET1 from a power supply 60; and a third input of summer 58 receives a signal $P_{LIN}$, which is a linear approximation of landing field altitude, from a potentiometer 62 through a filter 64. Potentiometer 62 produces the signal $P_{LIN}$ by dividing a voltage $V_{REF}$ input from a voltage reference source 65. Summer 58 outputs a signal $P_{DIF}$, indicative of the offset difference between the linear approximation of landing field altitude $P_{LIN}$ and the cabin pressure $P_C$ to an amplifier 66, whose output is connected to input channel 1 of analog multiplexer 56. Cabin pressure sensor 20 also includes an input terminal 67 for receiving a signal $P_{CSIM}$, which is input to the system to simulate the cabin pressure during bench testing. The signal $P_{LIN}$ from filter 64 is also connected to input channel 2 of analog multiplexer 26.

Channel 3 of multiplexer 56 receives an input indicative of the desired maximum rate of change of cabin pressure. A potentiometer 68 receives a voltage $V_{REF}$ from ten volt reference source 65 and outputs a voltage to a filter 70 which is connected to channel 3 of multiplexer 56.

Channel 4 of multiplexer 56 serves as a test input for the ±15 volt outputs of power supply 60 and receives a signal from a bench test selector switch 72 which instructs the central processing unit 54 to enter a bench test mode of operation. The +15 volt output of power supply 60 is connected to channel 4 through a resistance 74; and the −15 volt output of power supply 60 is connected to channel 4 through a resistance 76.

Channel 5 of multiplexer 56 receives a signal indicative of the speed of actuator motor 40 (not shown in FIG. 2). A summer 78 receives an output from tachometer demodulator 44 (not shown) through an amplifier 79 and receives an amplified reference voltage from voltage reference source 65 through an amplifier 82 and outputs a signal to an amplifier 83 which has the output thereof connected to channel 5 of multiplexer 56.

Channel 6 of multiplexer 56 receives an input indicative of the commanded rate of change of cabin pressure $\dot{P}_{CC}$.

Channel 7 receives an input indicative of the buffered actual rate of change of cabin pressure $\dot{P}_{CAB}$.

Channel 8 of multiplexer 56 receives a signal which indicates that actuator motor 40 (not shown) is driving valve 52 (not shown) open; and channel 9 receives a signal indicating that actuator motor 40 is driving valve 52 closed.

Channel 10 of multiplexer 56 receives the voltage $V_{REF}$ from voltage reference source 65. Channel 11 receives an internal reference ground signal. Channels 12, 14, and 15 are spares. Channel 13 receives an input from a power lost monitor 84 which monitors the five volt output from power supply 60.

Central processing unit 54 has a DATA driver connected to a DATA bus 85 from which data output signals are supplied to a latch 86 through a data buffer amplifier 88. Latch 86 has four outputs connected to the address terminals of multiplexer 56 for selectively addressing input channels 0 to 16 thereof. In order to read the analog signal input to a particular channel of multiplexer 56, central processing unit 54 first addresses the channel through latch 86, thereby causing the addressed channel to provide a multiplexer output voltage to a summing circuit 90 through a buffer amplifier 92. Central processing unit 54 also outputs a digital signal indicative of a predetermined voltage through latch 86 to digital-to-analog converter 28. Digital-to-analog converter 28, which receives a voltage $V^*_{REF}$ from reference voltage source 65 through an amplifier 94, converts the digital signal to the corresponding voltage. An inverter 96 inverts the output voltage of digital-to-analog converter 28 and provides a voltage $V_{D/A}$ to summing circuit 90, to a comparator 97 and to a sample-and-hold circuit 98. Summing circuit 90 receives an offset voltage-input; and the output of summing circuit 90 is a voltage indicative of the offset difference between the voltage input to the addressed channel of multiplexer 56 and the voltage output of digital-to-analog converter 28. An analog-to-digital comparator 100 receives the output of summing circuit 90 and outputs a digital signal indicative of whether the output of summing circuit 90 is positive or negative to input port 7 of a discrete input buffer 101. The invention may include additional input buffers 102 and 103, which provide to central processing unit 54 digital signals indicative of the status of selected flight variables and for self-testing of selected conditions within the cabin air pressure control system. For example, the output DAC 1 of comparator 97 is connected to input port 0 of discrete input buffer 102 to test whether the output of inverter 96 exceeds 5 V. In the illustrated embodiment, each of the input buffers 101, 102 and 103 includes eight data bits numbered 0-7; and each discreet buffer 101, 102 and 103 includes a digital read enable for selectively causing the data bits to be input to the central processing unit 54. Central processing unit 54 addresses discrete input buffers 101-103 by means of digital read signals from output ports 4, 3 and 2, respectively, of an address decoder 104, shown in FIG. 3. In order to complete the process of reading an addressed channel of multiplexer 56, central processing unit 54 outputs a digital read signal from output port 4 of address decoder 104 to the digital read 1 input port of discrete input buffer 101 (FIG. 2B) to cause the signal from analog-to-digital comparator 100 to be input to central processing unit 54 for processing thereby. Central processing unit 54 uses a successive approximation method to determine the voltage output of multiplexer 56. If the output of analog-to-digital comparator 100 indicates that the voltage $V_{D/A}$ is greater than the voltage output of multiplexer 56, then central processing unit 54 outputs a digital signal indicative of a second predetermined voltage to digital-to-analog converter 28 through latch 86. The above-described process continues until central processing unit 54 outputs a signal which approximates the output of multiplexer 56 within a prescribed tolerance. Central processing unit 54 reads each channel of multiplexer 56 by the above-described process. Additional information supplied to the processing unit 54 through discreet input buffers 101, 102 and 103 is described hereinafter.

It is contemplated that the present invention will be used in an aircraft which has one or more central air data computers, which provide information concerning flight variables to the cabin air pressure control system. In the illustrated embodiment, a multiplexer 108 is connected to a first central air data computer 110 and to a second central air data computer 112. Central processing unit 54 determines which of the central air data computers 110 or 112 will provide data to the aircraft cabin pressure control system, and outputs a computer select signal through output port 7 of an output buffer 113, shown in FIG. 3, to a select input of multiplexer 108.

Figure 3:
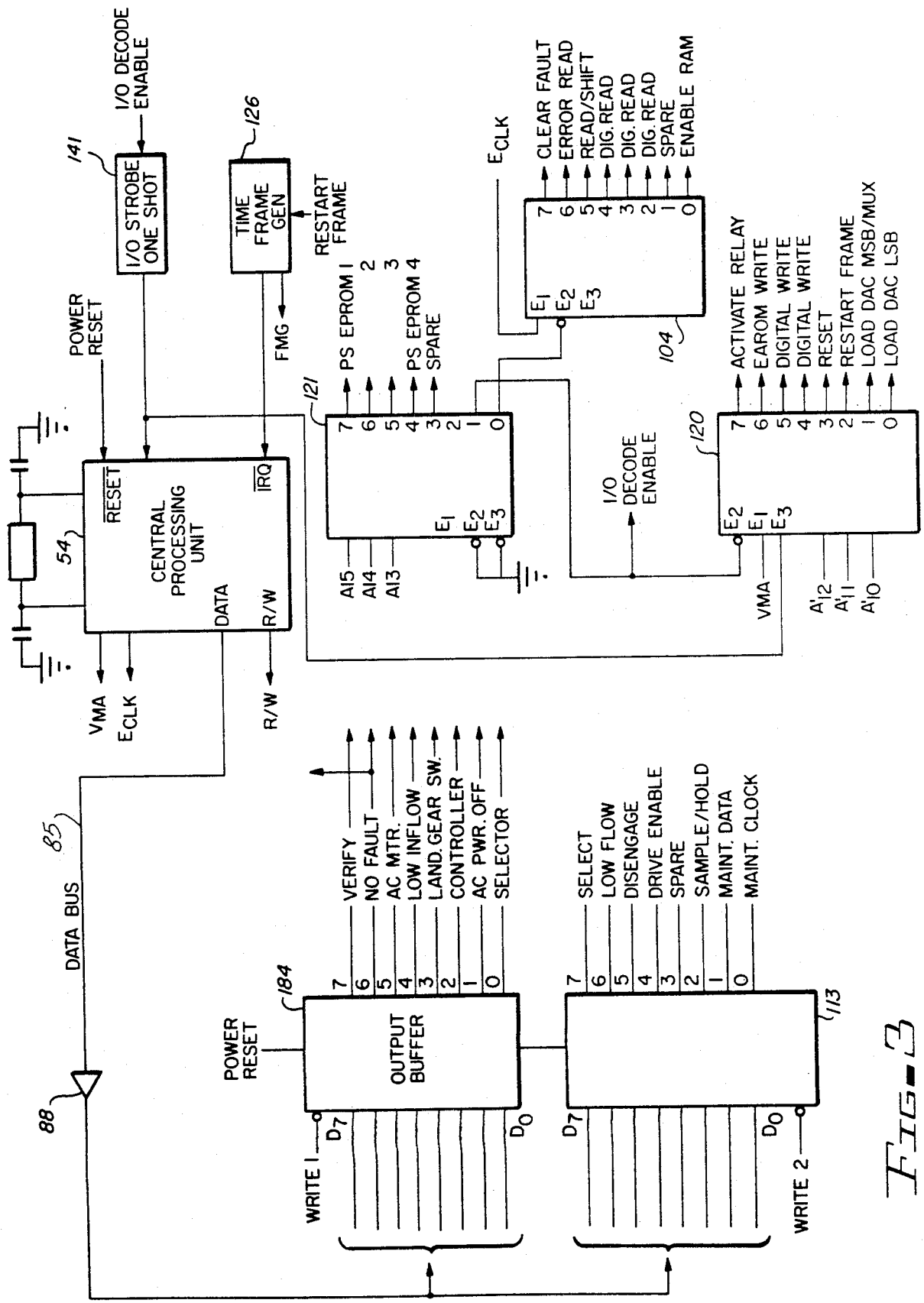
FIG. 3 is a functional block diagram illustrating outputs of the central processing unit of FIGS. 2A–2C.

An air data receiver 116 connected to the output of multiplexer 108 receives and conditions information words from the selected data computer 110 or 112. In a typical application, each information word received consists of 32 bits of data in a return-to-zero mode of transmission. The first 8 bits constitute referring to FIGS. 2A, 2B, 2C, and 3, an identification code for the transmitted word with the remaining bits constituting flight data. Air data receiver 116 stores all 32 bits of data, after which it sends an interrupt signal to an OR gate 117, which supplies the interrupt signal to the INTERRUPT REQUEST input terminal IRQ of central processing unit 54 through a flip-flop 118. Referring to FIG. 3, central processing unit 54 has an address decoder 120 connected to the MEMORY READY terminal thereof. An address decoder 121 is connected to address decoder 120; and address decoder 104 is connected to address decoder 121 to enable central processing unit 54 to selectively address other components of the system. Air data receiver 116 has a read/shift input connected to output pin 5 of address decoder 104 and a reset input connected to output pin 3 of address decoder 120. OR gate 117 also receives an input from a time frame generator 126, which periodically generates a signal for interrupting operation of central processing unit 54.

Central processing unit 54 triggers operation of time frame generator 126 by outputting a restart frame signal thereto through output port 2 of address decoder 120. Time frame generator 126 outputs a signal FMG to input port 7 of discrete input buffer 103 and to a fault flip-flop 128. If there is an electrical fault in the system, central processing unit 54 supplies a disengage signal to fault flip-flop 128 and to a second flip-flop 130 through an output buffer 113. Fault flip-flop 128 outputs an AUTO FAULT signal to input port 1 of discrete input buffer 101 to enable central processing unit 54 to monitor fault flip-flop 128.

If there is no failure in the system or if central processing unit 54 receives an input indicating clearance of a previously-existing fault, central processing unit provides a clear fault signal to fault flip-flop 128 through output port 7 of address decoder 119 to permit fault flip-flop 128 to output a signal to flip-flop 130, which also receives an ACTIVATE RELAY signal from central processing units 54 via output part 7 of address decoder 120. Flip-flop 130 produces an output signal for actuating a relay drive logic 134, which, when actuated, supplies a RELAY ON signal to input port 1 of discrete input buffer 103. Proper operation of the system requires sequential turning on of time frame generator 126, fault flip-flop 128, and flip-flop 130 to actuate relay logic drive circuit 134. A failure in the system interrupts the above-described sequence and the system relinquishes control of the air cabin air pressure.

A power reset circuit 136 outputs a signal for resetting or turning on the system to flip-flop 118, a one shot multivibrator 138 and and AND gate 140, which also receives an input from one shot multivibrator 138. After one shot 138 times out, the AND gate 140 supplies a signal to the RESET terminal of central processing unit 54. Resetting central processing unit 54 initializes the control parameters and prepares the system for ground mode operations. Power reset circuit 136 is energized by the voltage $V_{REF}$ from reference voltage source 65 and a 5 volt input from power supply 60.

Central processing unit 54 has two operational levels: foreground and background. The foreground deals with functions and data that must be processed with timing constraint limitations, which include reading information from air data receiver 116, updating the cabin pressure measurement input, updating the pressure rate of output and forming certain high-priority tests. The background level deals with functions which need not be updated with stringent timing constraints, such as infrequent tests and flight mode parameters which require lengthy calculations. Central processing unit 54 ordinarily operates within a time frame set by time frame generator 126. If time frame generator 126 generates an interrupt signal every 50 milliseconds, central processing unit 54 enters the foreground processing mode in response to the interrupt signal. Upon completion of foreground computations, central processing unit 54 returns to background computations for the balance of the 50 millisecond time frame until a new timing frame interrupt signal is received by INTERRUPT REQUEST input terminal IRQ of central processing unit 54.

Central processing unit 54 normally operates within the predetermined time frame unless OR gate 117 receives an actuating signal from air data receiver 116, in which event central processing unit 54 must return to the foreground processing mode to process the data words stored in air data receiver 116. Central processing unit 54 outputs a read/shift signal to read/shift input 122 of air data receiver 116 through output pin 5 of address decoder 104 which causes air data receiver 116 to input the data word stored therein to central processing unit 54 via data bus 85. There are many information inputs which may be received by air data receiver 116, only three of which are of significance to the aircraft pressure control system. The significant inputs are barometrically corrected altitude, absolute altitude and the barometric corrections. Central processing unit 54 requires the absolute altitude to monitor and control the pressure differential between the ambient pressure and the cabin pressure and to determine the appropriate rate of change of cabin pressure as a function of the cabin altitude schedule. Barometrically corrected altitude enables central processing unit 54 to establish cabin air pressure in preparation for landing. Central processing unit 54 decodes the identification code of the data word received from air data receiver 116 to determine if the data word is relevant to aircraft pressure control system operation. If the received data word is relevant to operation of the aircraft pressure control system, central processing unit 54 stores the data word and calculates a new cabin pressure rate command. After storing the data word, central processing unit 54 outputs a RESET signal through pin 3 of address decoder 120 to the reset input of air data receiver 116 to put air data receiver 116 in condition to receive and store additional signals which may be received from multiplexer 108.

If central processing unit 54 is unable to complete the foreground tasks within the predetermined time interval, an input/output strobe one-shot 141 receives an I/O decode enable signal from central processing unit 54 through output port 1 of address decoder 121. Input/output strobe one-shot 141 outputs a signal to the memory ready input MR of central processing unit 54 to enable central processing unit 54 to continue foreground tasks until one-shot 141 times out.

FIGS. 2 and 3 illustrate in detail the functions of the circuitry which FIG. 1 illustrates in general. In order to change the cabin air pressure, central processing unit 54 calculates a voltage $V_{D/A}$ which corresponds to a commanded rate of change of cabin air pressure $\dot{P}_{CC}$ and outputs a trigger signal from output port 2 of output buffer 113 to sample-and-hold circuit 98, which causes sample-and-hold circuit 98 to read and hold for a predetermined time the signal output from inverter 96. A filter circuit 140 filters signal $\dot{P}_{CC}$ and outputs the filtered commanded rate of cabin pressure change signal to channel 6 of multiplexer 56 and to an amplifier 144. Summing circuit 30 receives the output of amplifier 144 and the output signal $\dot{P}_{CA}$ of rate amplifier 34 along with an input from an amplifier 146, which amplifies voltage $V_{REF}$ output from reference voltage source 65 to provide an offset voltage.

A summing circuit 148 also receives the actual rate of change of cabin pressure signal $\dot{P}_{CA}$ and the voltage $V_{REF}$ and provides a signal indicative of the actual rate of cabin pressure offset by the voltage $V_{REF}$ to a buffer amplifier 150, which provides the input $\dot{P}_{CAB}$ to channel 7 of multiplexer 56.

Summing circuit 30 provides a signal indicative of the offset difference between the commanded rate of cabin pressure change and the actual rate of cabin pressure change to summing circuit 38 through a lead-lag compensation circuit 156. Tachometer demodulator 44 receives an energizing voltage of 115 VAC from power supply 60 along with input signals TACH HI and TACH LO from tachometer 40 (shown in FIG. 1). Amplifier 79 amplifies the output of tachometer demodulator 44 and provides a signal to an input of summing circuit 38, which outputs a speed error signal for controlling operation of actuator motor 42 (not shown).

FIG. 2 illustrates details of drive open switch 48 and drive closed switch 50 of FIG. 1. A first threshold circuit 152 and a second threshold circuit 154 receive the amplified speed error. Threshold circuit 152 provides a digital output to an AND gate 156, and threshold circuit 156 provides a digital output to an AND gate 158. Central processing unit 54 provides a drive enable signal to AND gates 156 and 158 through output port 4 of output buffer 113. The configuration of threshold circuit 152 is such that the output thereof switches from low to high when a positive speed error signal rises to a predetermined voltage, for example 1.25 volts, and switches from high to low when a positive speed error signal decreases to a predetermined voltage, for example 1.05 volts. The configuration of threshold circuit 154 is such that the output thereof switches from low to high when a negative speed error signal drops below a predetermined value, such as −1.25 volts, and switches from high to low when a negative speed error signal rises above a predetermined value, such as −1.05 volts. Upon receipt of a logic high input from threshold circuit 152 and the drive enable signal from central processing unit 54, AND gate 156 outputs a motor open drive drive command signal to input port 5 of discrete input buffer 103 and to a solid state relay 160, which electro-optically isolated from spurious inputs.

Relay drive logic circuit 134 controls a relay 168, which, when in the on position, provides a motor/valve drive open voltage of 115 VAC, to actuator motor 42, shown in FIG. 1 through a circuit comprising solid state relay 160 connected in parallel with a bleeder resistance 170. An AC/DC converter 172 has an input connected to solid state relay 160 and bleeder resistance 170 to produce a DC signal for input to channel 8 of multiplexer 56.

Upon receipt of a logic high input from threshold circuit 154 and the drive enable signal from central processing unit 54, AND gate 158 outputs a motor closed drive command signal to input port 6 of discrete input buffer 103 and to a second solid state relay 174. Relay 168 provides a suitable motor/valve drive closed voltage to actuator motor 42 (shown in FIG. 1) through a circuit comprising solid state relay 160 connected in parallel with a bleeder resistance 182. An AC/DC converter 184 has an input thereof connected between the anode of photo-diode 178 and bleeder resistance 182 to produce a DC signal for input to channel 9 of multiplexer 56.

As shown in FIG. 3, amplifier 88 connects data output bus 85 from central processing unit 54 to output buffer 113 and to an output buffer 184, each having 8 data bits numbered 0-7 for controlling various components of the system. Central processing unit 54 actuates output buffers 113 and 184 by means of digital write signals from output ports 4 and 5, respectively, from address decoder 120. Data bits 0 and 1 of output buffer 113 are used during bench testing of the system. The outputs from data bits 2, 3, 4 and 7 have been previously discussed with reference to the operation of the circuitry of FIG. 2. In the illustrated embodiment of the invention, the data bit output from port 3 of output buffer 113 is a spare. The output signal from port 6 of output buffer 113 indicates whether valve 52 of FIG. 1 is open or closed.

Figure 4:
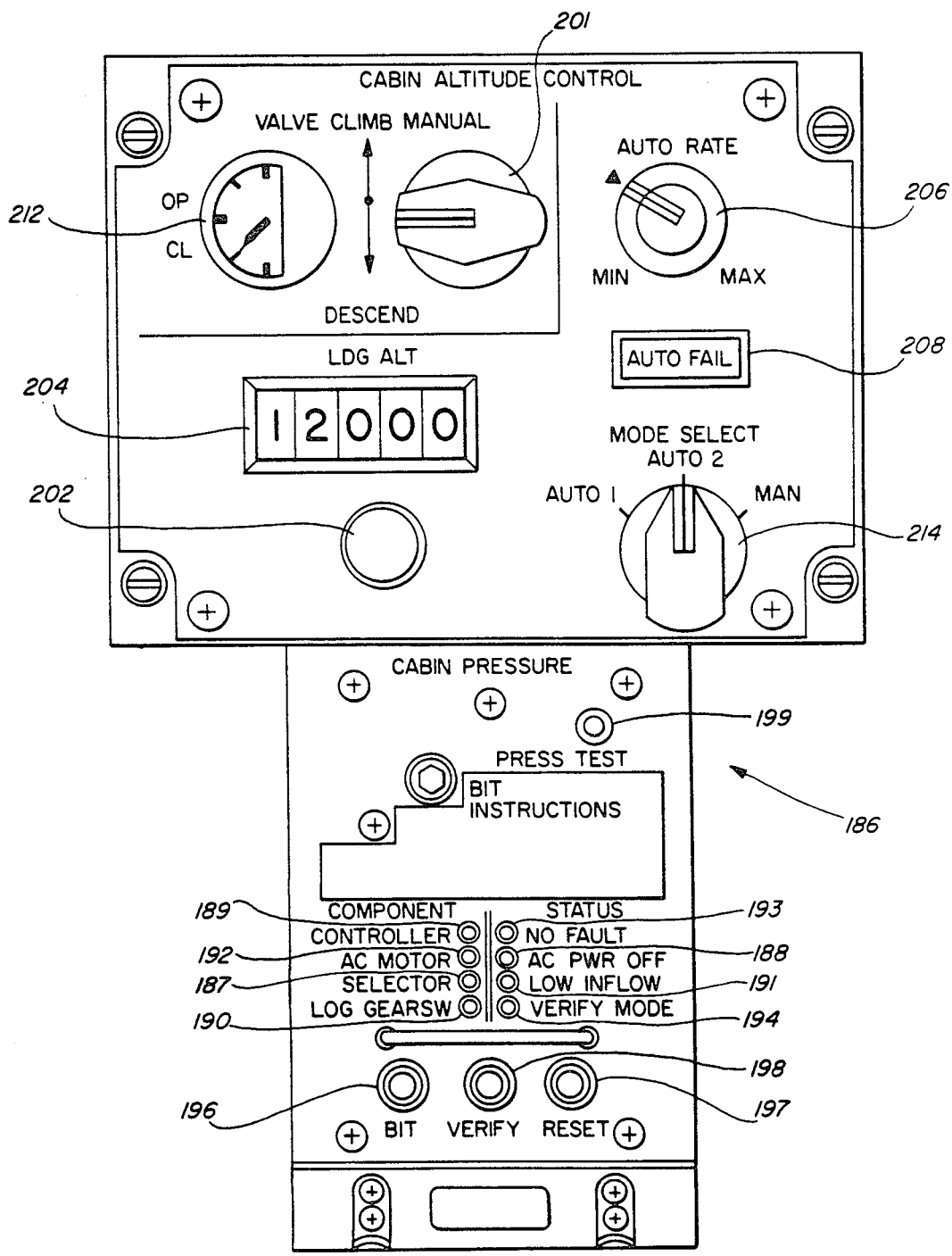
FIG. 4 is a diagram of a control panel used in conjunction with the system of the FIGS. 2A–2C.

The data bits output from ports 0-7 of output buffer 184 control indicator panel 186, shown in FIG. 4. Data bits output from ports 0-7 control a selector fault indicator 187, a power off indicator 188, a controller fault indicator 189, a landing gear fault indicator 190, a low inflow fault indicator 191, an actuator motor fault indicator 192, a no fault indicator 193 and a verify mode indicator 194, respectively.

Referring again to FIG. 2, discrete input buffer 101 has 8 input ports labeled 0-7 for receiving digital signals for input to central processing unit 54. Input port 0 receives a no fault signal from output port 6 of output buffer 184 in a self-test mode to verify operation of the system input and output ports. Input port 1 receives an auto fault signal from flip-flop 128 in the self-test mode to check operability of flip-flop 128 in the frame/clear-fault/activate relay sequence. The auto fault signal also enables central processing unit 54 to monitor the state of an auto fail indicator 195 in indicator panel 186 (FIG. 4). Input port 2 receives a signal from the built-in test switch 196 in indicator panel 186 for initiating the built-in test sequence. Input port 3 receives a reset signal from a reset switch 197 in indicator panel 186. Input port 4 receives a signal from a verify switch 198; and input port 5 receives a signal from a press test switch 199 on indicator panel 186. Input port 6 receives the drive enable signal from output port 4 of output buffer 113 for performing operational tests within the system. Input port 7 of discrete input buffer 101 receives the output signal of analog-to-digital comparator 100.

Input port 0 of discrete input buffer 102 receives a no fault signal from no fault indicator 193. Input ports 1-6 receive signals from valve 52 (FIG. 1), a cross-channel switch 298 which is connected to relay 168, a signal indicative of manually controlled descent, an auto enable signal indicative of whether the system is in an automatic control mode, a landing gear signal, and a door closed signal, respectively. Input port 7 of discrete input buffer 102 receives the interrupt signal from air data receiver 116, which causes interruption in operation of central processing unit 54. By polling the signal input to port 7 of discrete input buffer 102, central processing unit 54 determines whether air data receiver 116 was the source of an interrupt signal.

The output signal of comparator 97 is input to input port 0 of discrete input buffer 103 to enable partial testing of digital-to-analog converter 28. The signals input to ports 1, 5, 6 and 7 have been previously described hereinabove. In the illustrated embodiment input ports 2 and 3 are spares; and input port 4 receives a no fault signal from no fault indicator 193.

The invention provides two auto modes and a manual mode for controlling valve 52. In the auto modes the invention positions valve 52 in response to sensed cabin pressure according to cabin pressure control program logic. In the manual mode the outflow of valve 52 is controlled by manual inputs to a manual control knob 201 on panel 186. Referring to FIG. 4, panel 186 includes an altitude selector 202 which provides selection of landing field altitude between −1000 and +15,000 feet. A high-resolution tape display 204 indicates the landing field altitude setting.

Panel 186 further includes an auto rate limit selector 206, which provides selection of the maximum cabin altitude rate of change over ranges of 30 to 1200 sea level feet per minute while descending and 50 to 2,000 sea level feet per minute while ascending.

An auto fail annunciator 208 is illuminated when central processing unit 54 outputs an auto fail signal.

Panel 186 also includes a valve position indicator 212 which indicates the position of outflow valve 52.

Panel 186 further includes a mode selector 214 for selecting one of the two auto control modes or a manual mode for regulating the aircraft cabin pressure. In the manual mode, a crew member uses manual control knob 206 to provide control signals for regulating the position of outflow valve 52. In an auto mode, one of two identical aircraft cabin pressure control systems 10 as described hereinabove controls the aircraft cabin air pressure while the other is in a standby status receiving all inputs and performing all functions necessary for controlling the aircraft cabin air pressure, but without providing control signals to actuator motor 42 unless the selected aircraft cabin pressure control system 10 experiences a failure.

The only crew inputs required for operation of the invention in the auto mode are landing field altitude selection, and maximum rate of change of cabin air pressure, both of which are made prior to takeoff. No inflight changes are required unless landing destination is changed. The invention controls the cabin air pressure according to an autoschedule, which is a family of curves of cabin altitude versus aircraft altitude. FIG. 5 illustrates a typical autoschedule. The invention maximizes passenger comfort since the autoschedule maintains low rates of cabin pressure change regardless of changes in aircraft altitude. For a given aircraft, the actual cabin altitude schedule is based on the lowest cabin altitude rate compatible with the maximum design aircraft climb rate while the aircraft is climbing to maximum altitude. In the auto mode of operation, the rate of change of cabin altitude is controlled by the smaller of either the autoschedule altitude rate or a preselected rate limit, such as 500 feet per minute while the aircraft is ascending or 300 feet per minute while the aircraft is descending.

The invention provides control of cruise altitude to allow apparent cabin altitude, as indicated by the cabin air pressure, to remain constant during cruise with atmospheric altitude variations within predetermined limits. When the invention senses that the aircraft altitude rate of change over a predetermined time interval has not exceeded a predetermined number of feet per minute, the invention clamps to the existing autoscheduled value of cabin altitude, which becomes the commanded cabin altitude. The commanded cabin altitude is maintained until the aircraft has climbed or descended more than a predetermined distance from the altitude at which the cruise control was imposed or until the differential between cabin pressure and ambient pressure reaches a predetermined limit. A typical criterion of 500 feet in two minutes is used to determine that the aircraft has reached cruise altitude. If the aircraft cruise altitude drifts sufficiently to exceed ±500 feet from the altitude at which cruise control was imposed, the cabin altitude simply unclamps and the cabin climbs or descends at a predetermined rate under the control of central processing unit 54. Aircraft descent beyond 1000 feet in a one minute interval triggers a descent logic sequence within central processing unit 54, during which time the autoschedule logic remains inoperative.

The autoschedule command and cruise control logic become operative when central processing unit 54 receives a landing gear signal from discrete input buffer 102 indicating flight. The commanded cabin altitude is the highest of either the autoschedule value or the selected landing field altitude unless overridden by control logic which prevents excessive differentials between the cabin pressure and the ambient pressure.

The auto cabin altitude schedule is designed to limit cabin-to-atmosphere pressure differentials to a predetermined value for a representatively rapid aircraft climb. Since lightly loaded aircraft can climb at higher rates than heavily loaded aircraft, it is possible that the crew may select a rate limit incompatible with the actual aircraft climb; therefore central processing unit 54 includes a pressure differential limit feature to prevent the rate of change of pressure differential from exceeding a predetermined value.

Figure 6:
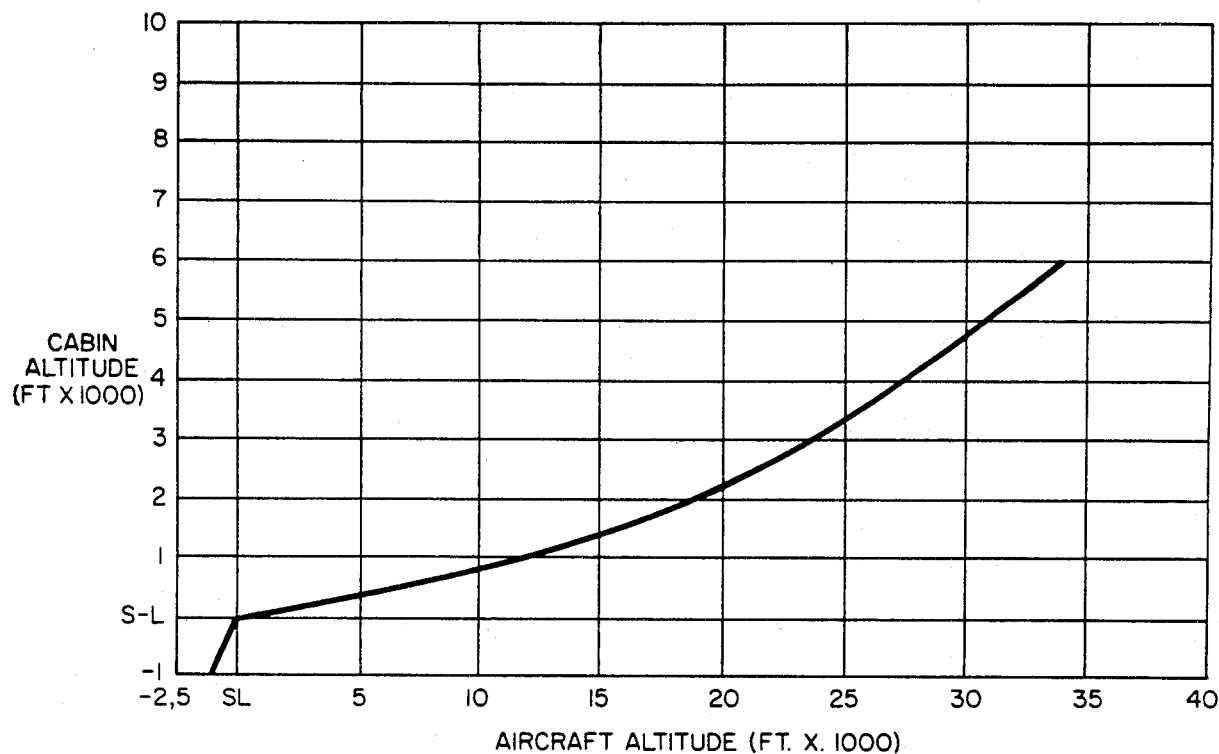
FIG. 6 is a graph representing the changes in cabin air pressure from door closure to takeoff.

Starting with the aircraft on the ground with the fuselage doors open, outflow valve 52 will be fully open with no power applied thereto. Aircraft cabin pressure will therefore be essential equal to atmospheric pressure regardless of cabin air inflow. Referring to FIG. 6, door closure will normally cause cabin altitude to decrease to a selected value such as 40 feet below field altitude due to pressure drop through outflow valve 52. Just prior to takeoff, prepressurization occurs at a nominal 300 foot per minute rate until the cabin pressurization attains a value corresponding to 150 feet below the field altitude. After liftoff, cabin pressure decreases at a nominal rate of 500 feet per minute until the cruise altitude logic discussed hereinabove assumes control of the cabin pressure.

Figure 7:
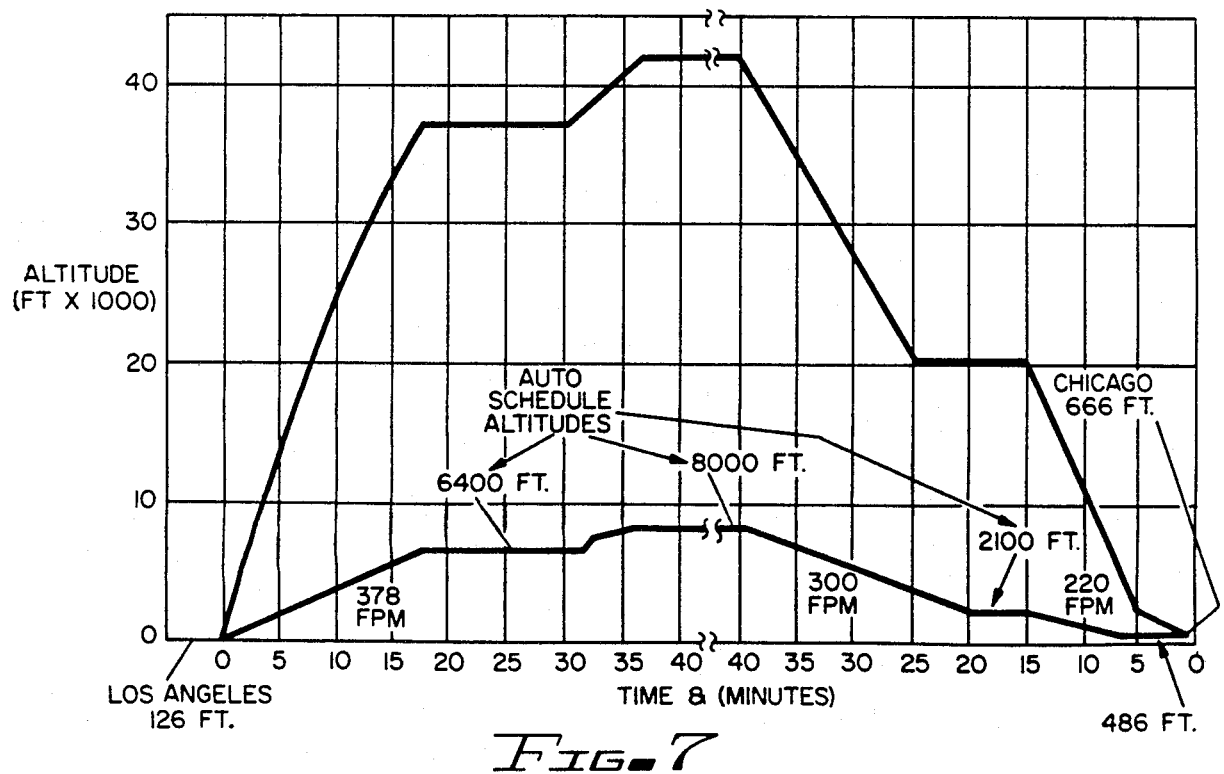
FIG. 7 is a graph illustrating a representative flight profile and corresponding cabin altitude profile generated by the invention for a flight from Los Angeles to Chicago.

Operation of the auto control logic and the autoschedule is illustrated by describing operation of the invention during a typical aircraft flight from Los Angeles to Chicago, which is typical of a flight with both takeoff and landing altitudes near sea level. Referring to FIG. 7, the Los Angeles to Chicago flight involves a takeoff at 126 feet, a 17 minute climb to 37,000 feet, an additional 7 minute climb to 42,000 feet after a short hold period, an approximately 3 hour cruise at 43,000, a 15 minute descent to 20,000 feet with a 10 minute hold, and a 15 final descent to 666 feet. The crew selects the 666 foot landing altitude prior to takeoff and no inflight reselections are made.

At takeoff, the cabin climbs on the autoschedule at a rate of approximately 380 feet per minute. The cabin pressure holds at the scheduled value during the aircraft altitude hold at 37,000 feet and then climbs again on the autoschedule at a rate of approximately 230 feet per minute as the aircraft climbs from 37,000 feet to 42,000 feet. The cabin pressure levels out at the cruise altitude of 8,000 feet during the 42,000 foot cruise portion of the flight. Upon aircraft descent of 1,000 feet, the cabin pressure starts descending toward the higher of the autoschedule value or the 666 foot landing altitude selection. As the depicted schedule descent exceeds 300 sea level feet per minute, the cabin descent is rate limited at that value. As the aircraft levels off at 20,000 feet, the cabin continues down on rate limit until the scheduled value is reached for the aircraft altitude of 20,000 feet. When aircraft descent is again initiated, the cabin pressure descends on the autoschedule at a rate of approximately 220 sea level feet per minute until an altitude of 486 feet is reached, which is greater than 80 feet below the selected landing altitude. After touchdown, the cabin pressure rate increase at 600 feet per minute until outflow value 52 is fully opened. During such a flight the crew would make no adjustments of the invention; and cabin rate of change would be maintained within human comfort limits throughout the flight.

The flow diagrams shown in FIGS. 8-16 and the description of the structural features and functional requirements of the invention enable one of ordinary skill in the art to program central processing unit 54 to practice the invention. The flow diagrams of FIGS. 8-16 show functional requirements which are programmed into central processing unit 54, which may be a Motorola MC 6802 microprocessor, and do not necessarily specify the order in which computations and functional tests must be performed.

Figure 8A:
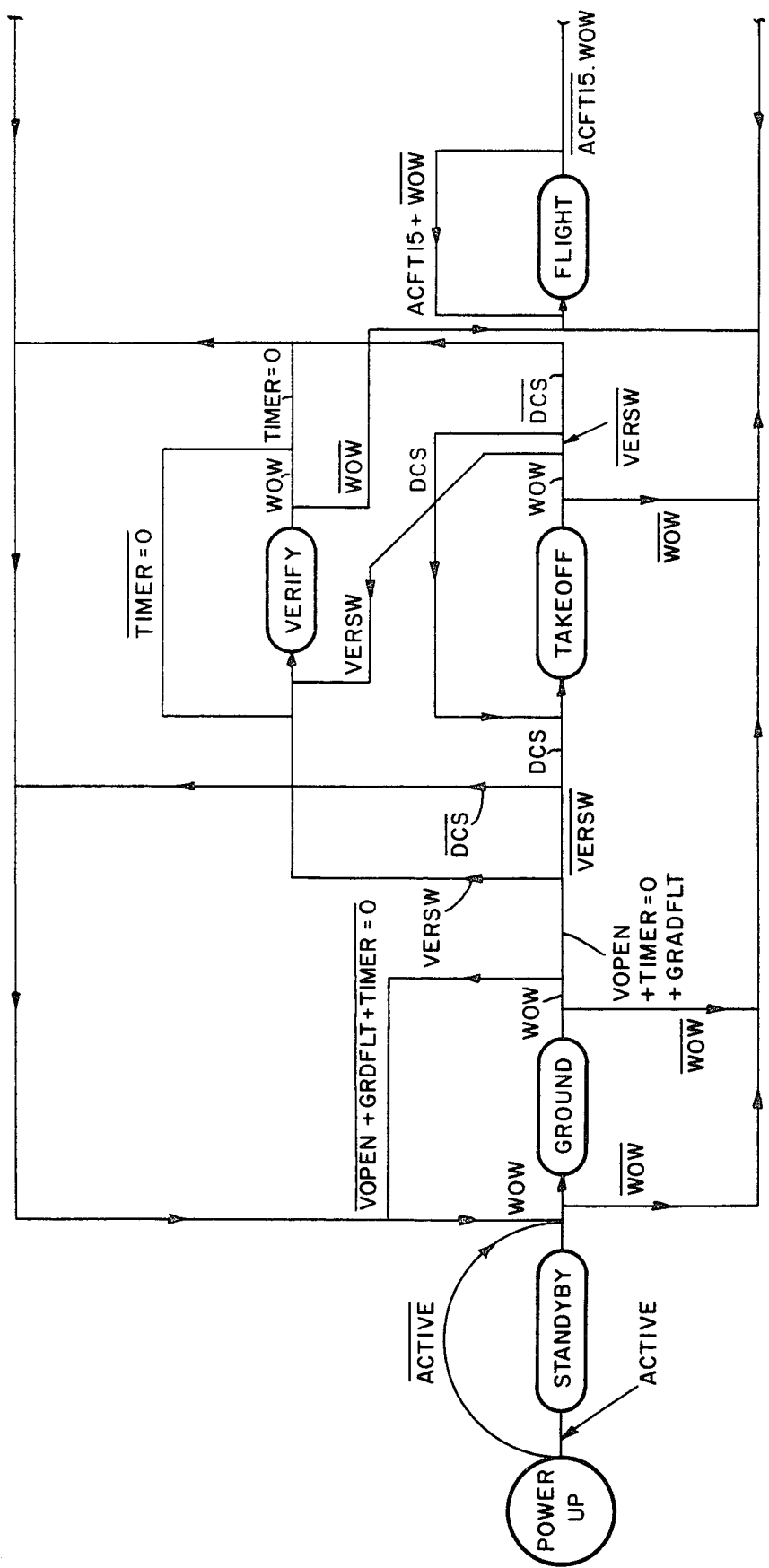
FIG. 8, shown in two parts as FIGS. 8a and 8b, is a mode selection control flow diagram.
Figure 8B:
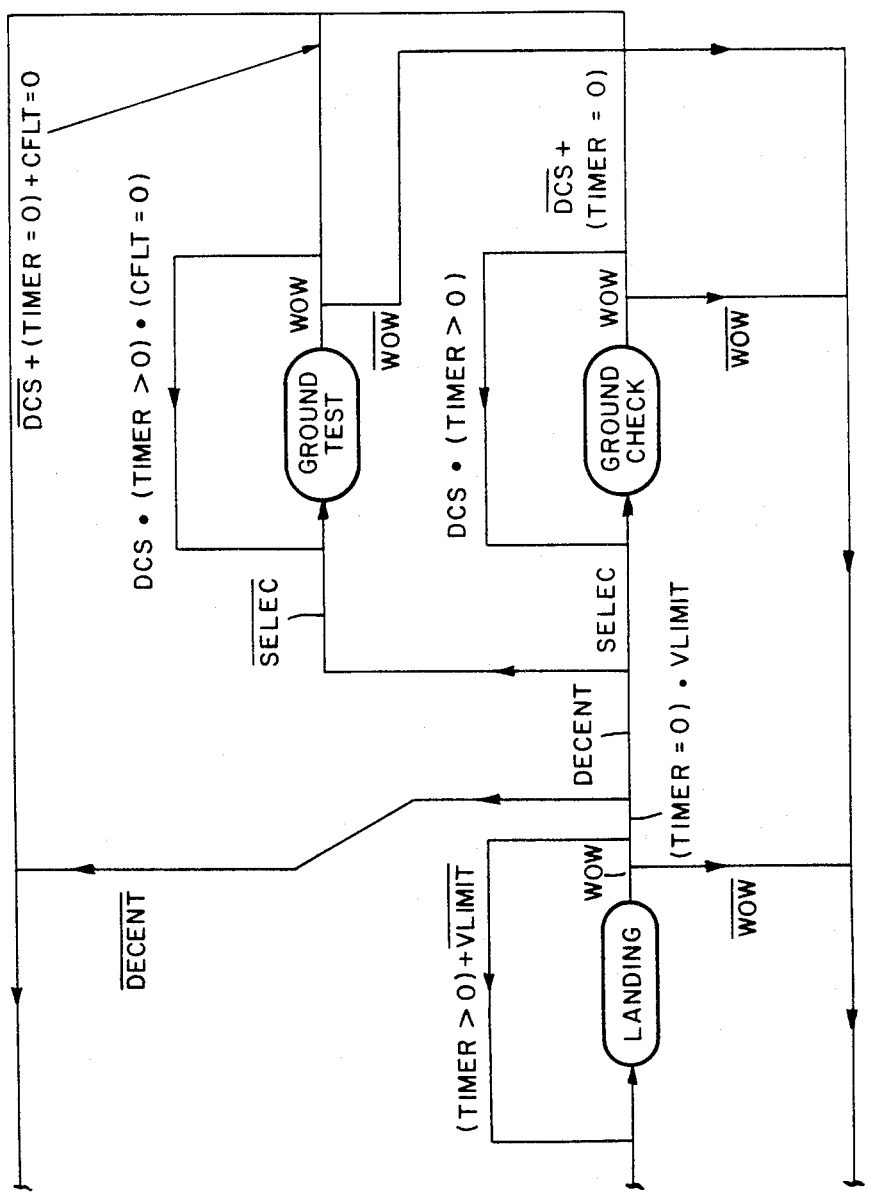
Figure 12E:
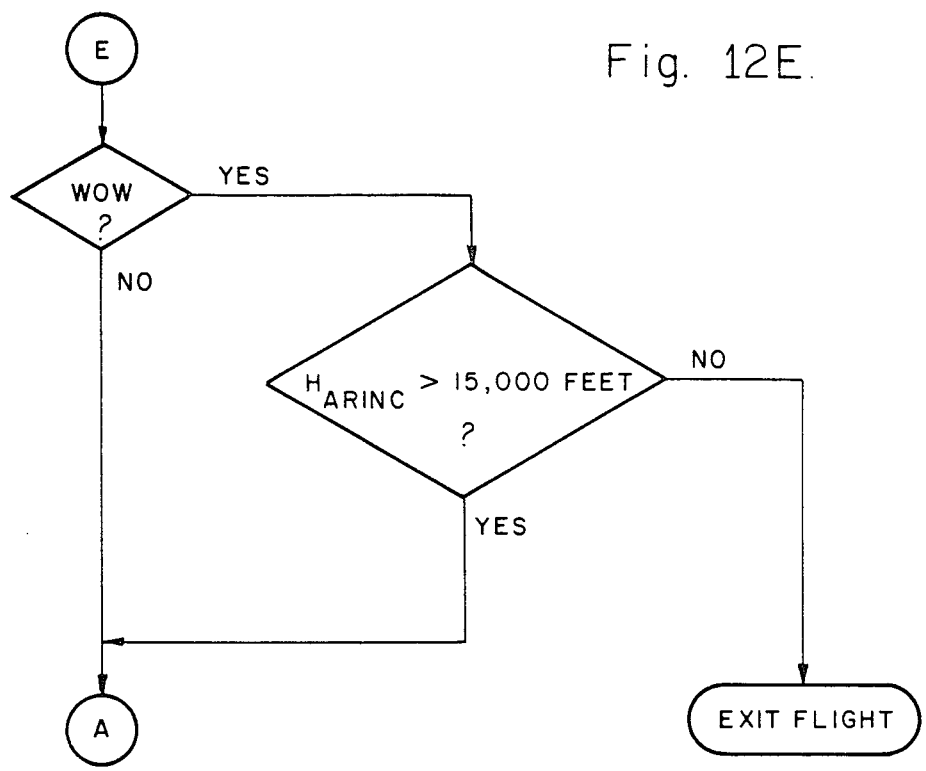
FIGS. 12A–12E (FIG. 12B is shown in two parts as FIGS. 12Ba and 12Bb) are auto-flight mode flow diagrams.
Figure 9:
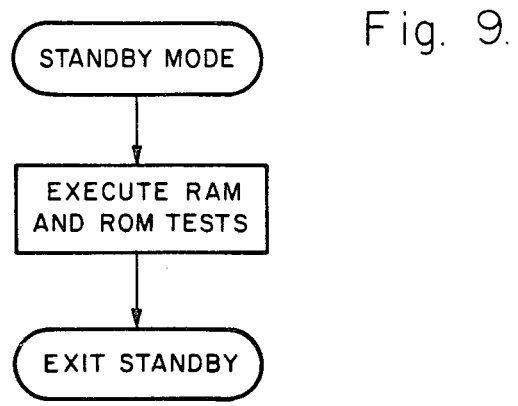
FIG. 9 is a standby mode flow diagram.

Referring to FIGS. 8*a*, 8*b* and 9, central processing unit 54 enters a standby mode after being initially powered-up. After completion of the tasks of standby mode, central processing unit 54 enters a ground mode if discrete input buffer 102 receives a landing gear signal indicative of a high weight-on wheels signal; and if the weight-on wheels signal is low, central processing unit 54 will enter a takeoff mode.

If the weight-on wheels signal goes low during ground mode execution, central processing unit 54 transfers to the flight mode. After ground mode functions have been fulfilled and verify mode button 194 has been depressed as indicated by a low state on input 4 of discrete input buffer 101, central processing unit 54 enters a verify mode. If verify mode push button 194 has not been depressed and the throttle signal goes high, central processing unit 54 enters the takeoff mode.

The verify mode has a duration of 10 seconds after which central processing unit 54 returns to the ground mode. A low weight-on wheels signal causes immediate exit from verify mode into the flight mode.

Central processing unit 54 exits the takeoff mode and enters the flight mode if the weight-on wheels signal goes low. Otherwise, central processing unit enters the verify mode if the verify mode push button 194 is depressed or to the ground mode if the throttle goes low.

The flight mode is entered from any other mode when a low weight-on wheels signal is sensed. According to the state of inputs from mode selector 216 of indicator panel 186, central processing unit 54 will execute the automatic flight control mode or the manual control mode. Central processing unit 54 will leave the flight mode and go into a landing mode when the weight-on wheels signal goes high provided that the aircraft altitude is less than 15,000 feet. If the weight-on wheels signal goes low in the landing mode, central processing unit 54 returns to the flight mode. If the weight-on wheels signal remains high and the valve closed signal goes low, central processing unit 54 exits the landing mode and enters the ground mode if the descent detect flag is down. If the descent detect flag is high, central processing unit 54 enters the ground check mode.

Central processing unit 54 will remain in the ground check mode until an internal 15 second timer, which is set upon entry into the ground check mode, times out after which central processing unit 54 enters the ground mode. If the weight-on wheels signal goes low during ground check execution, central processing unit 54 transfers to the flight mode.

The ground mode is entered from all of the other operating modes except the flight mode as shown in FIG. 8. In particular the ground mode is entered following completion of the standby mode checks. A no weight-on wheels condition causes an immediate exit from the ground mode, overriding any test conditions in the ground mode and initiates the flight mode.

Figure 10:
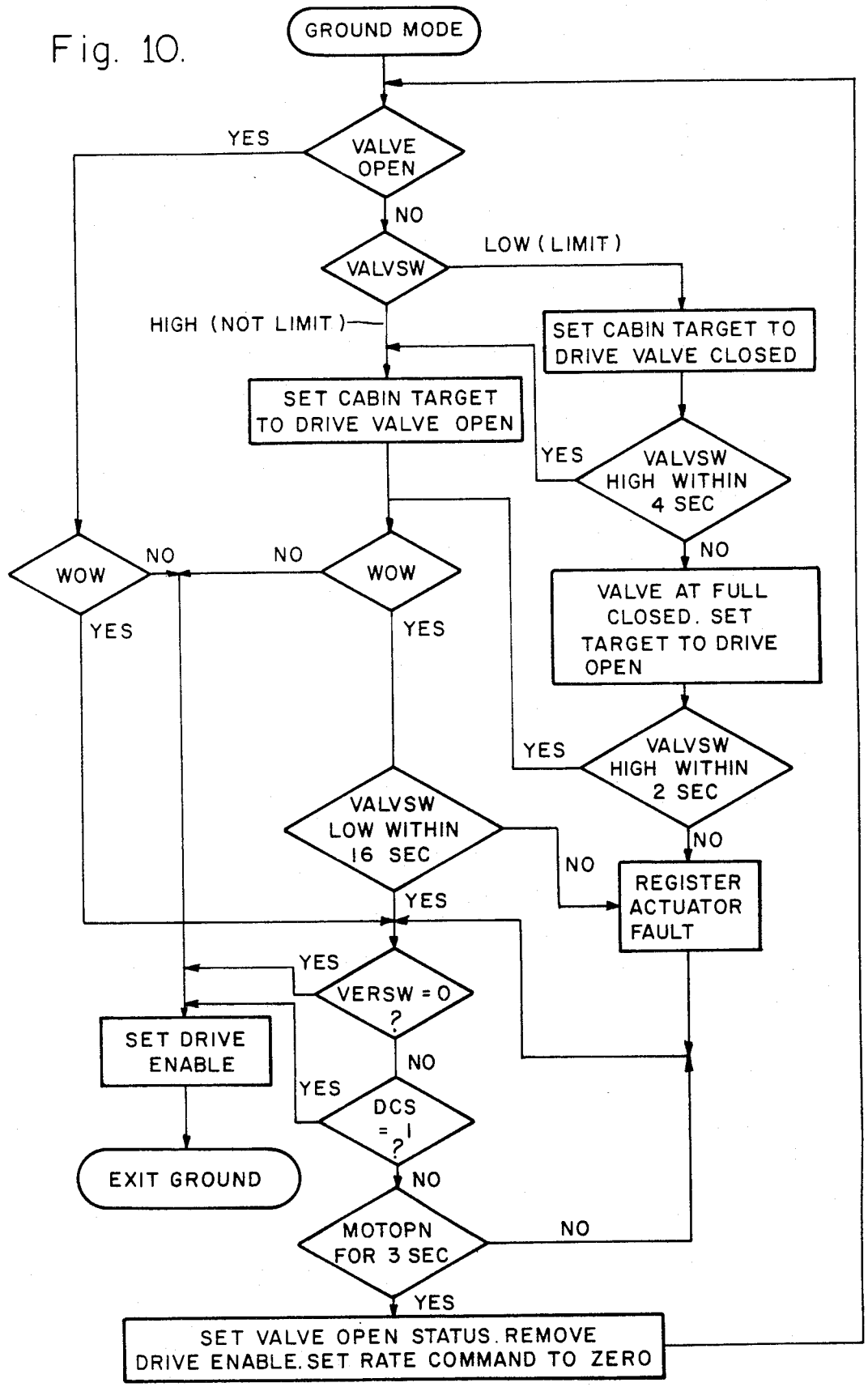
FIG. 10 is a ground mode flow diagram.

FIG. 10 is a flow diagram of the ground mode. The ground mode drives and maintains outflow valve 52 at a full-open position to prevent pressurization of the cabin, which could prevent opening of the doors of the aircraft. If outflow valve 52 is set at an intermediate position, as indicated by the valve closed signal being at a high state, when central processing unit 54 enters the ground mode, outflow valve 52 is driven open by setting a target cabin altitude of 16,000 feet and a decreasing pressure rate command limit of 2.162 inches of mercury per minute. When the valve closed signal goes from high to low, and the motor open drive command continues to exist for an additional 4 seconds, outflow valve 52 is declared to be fully opened, and the rate command is set to zero while the drive enable signal is reset to zero, thereby disabling solid state relays 162 and 174. If the valve closed signal fails to make the transition from high to low within a predetermined time, an actuator fault is declared.

If the valve closed signal is already at a low state, indicating that the valve is at a limit and with no prior valve-open information, central processing unit 54 must determine if outflow valve 52 is at the full-closed or the full-open position. Central processing unit 54 determines the position of outflow valve 52 by setting the target cabin altitude at −2,000 feet and setting an increasing pressure rate command limit of −1200 feet per minute until the valve closed signal goes to a high state, or for a maximum of 2 seconds. The target cabin pressure is then set to 16,000 feet and the pressure rate command limit is set to −2.162 inches of mercury per minute. If the valve closed signal does not show a transition from a low state to a high state and back to a low state within 16 seconds, an acutuator fault is declared.

If outflow valve 52 is known to be open, solid state relays 162 and 174 remain disabled; and the valve drive sequence and test are not repeated. Central processing unit 54 sets the drive enable on any exit from the ground mode.

Figure 11:
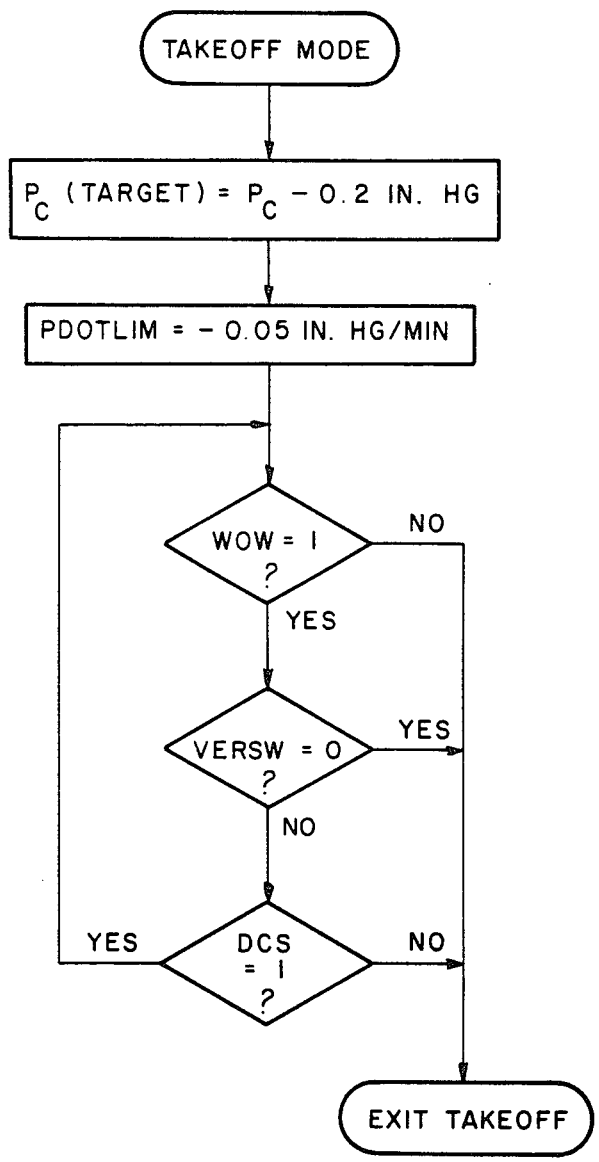
FIG. 11 is a takeoff mode flow diagram.
Figure 12A:
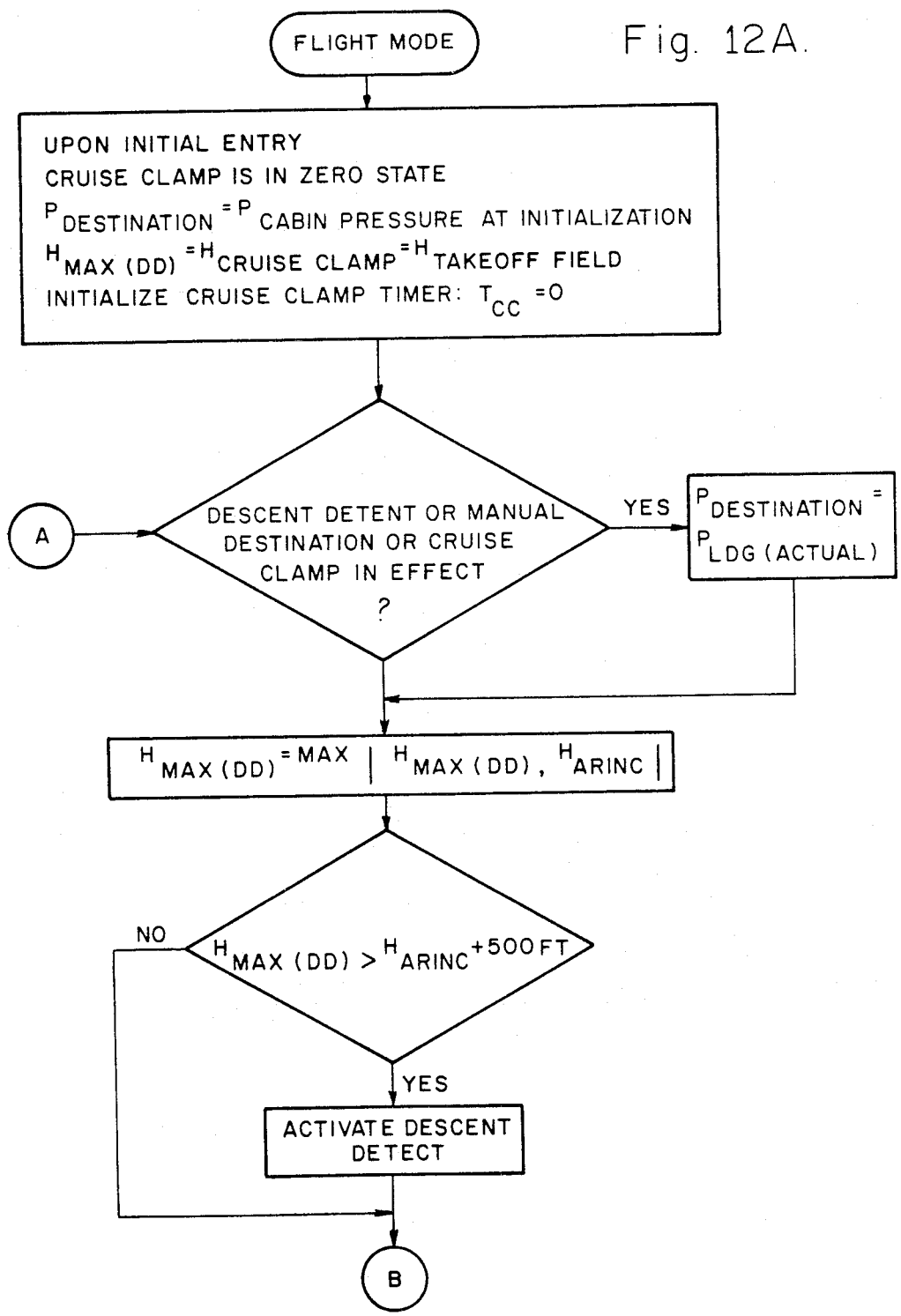
Figure 12B:
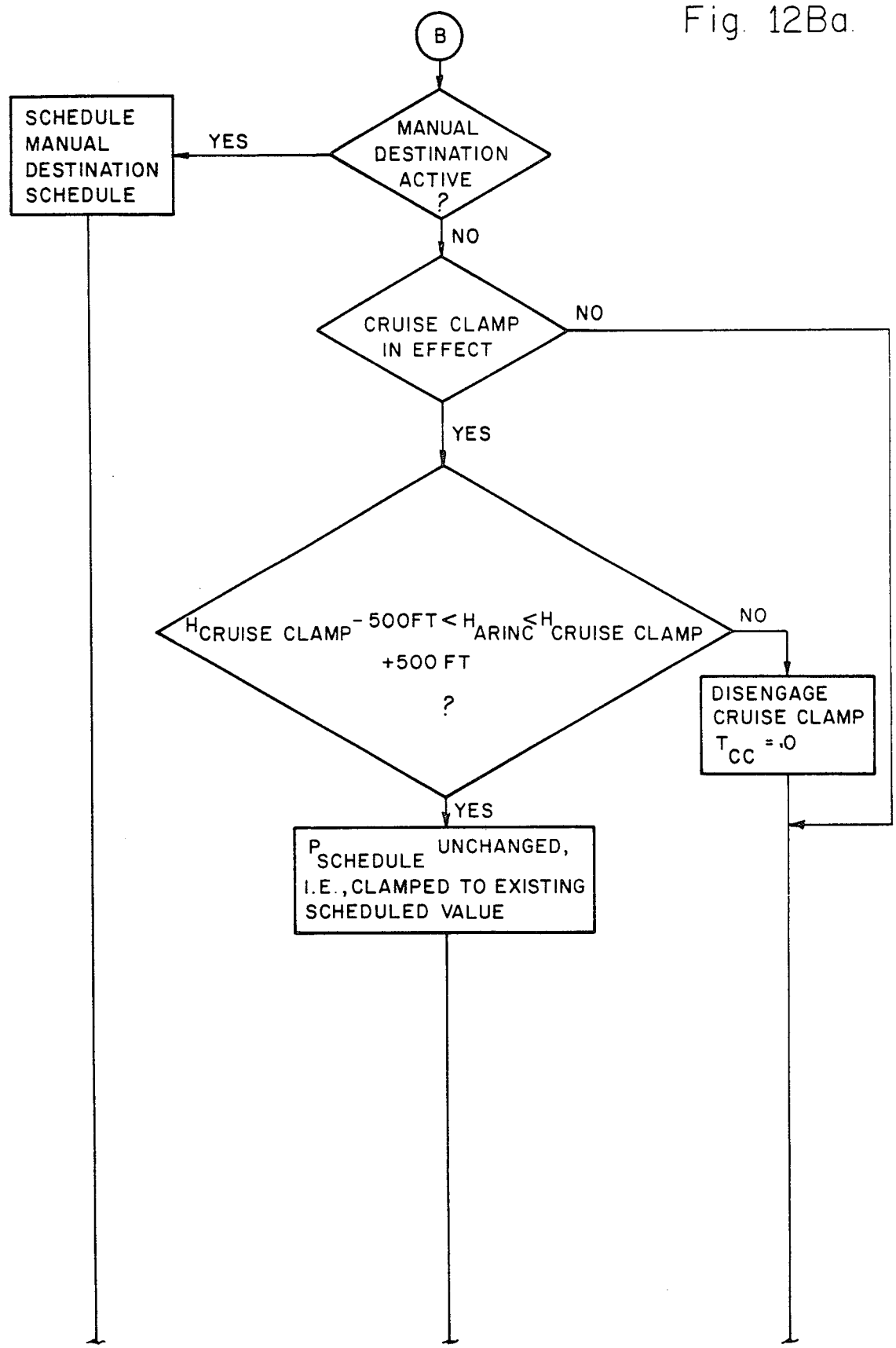
Figure 12B:
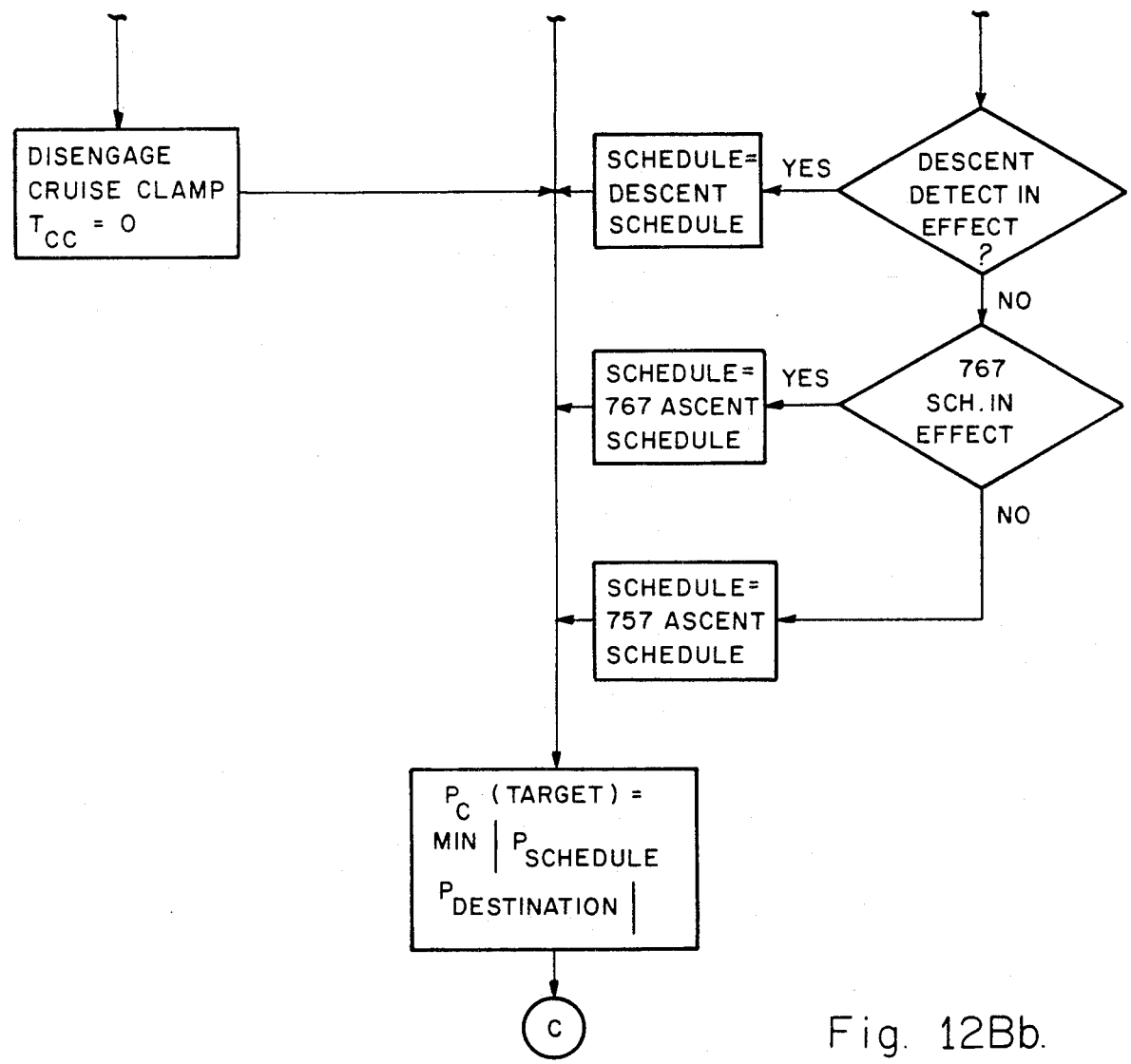
Figure 12C:
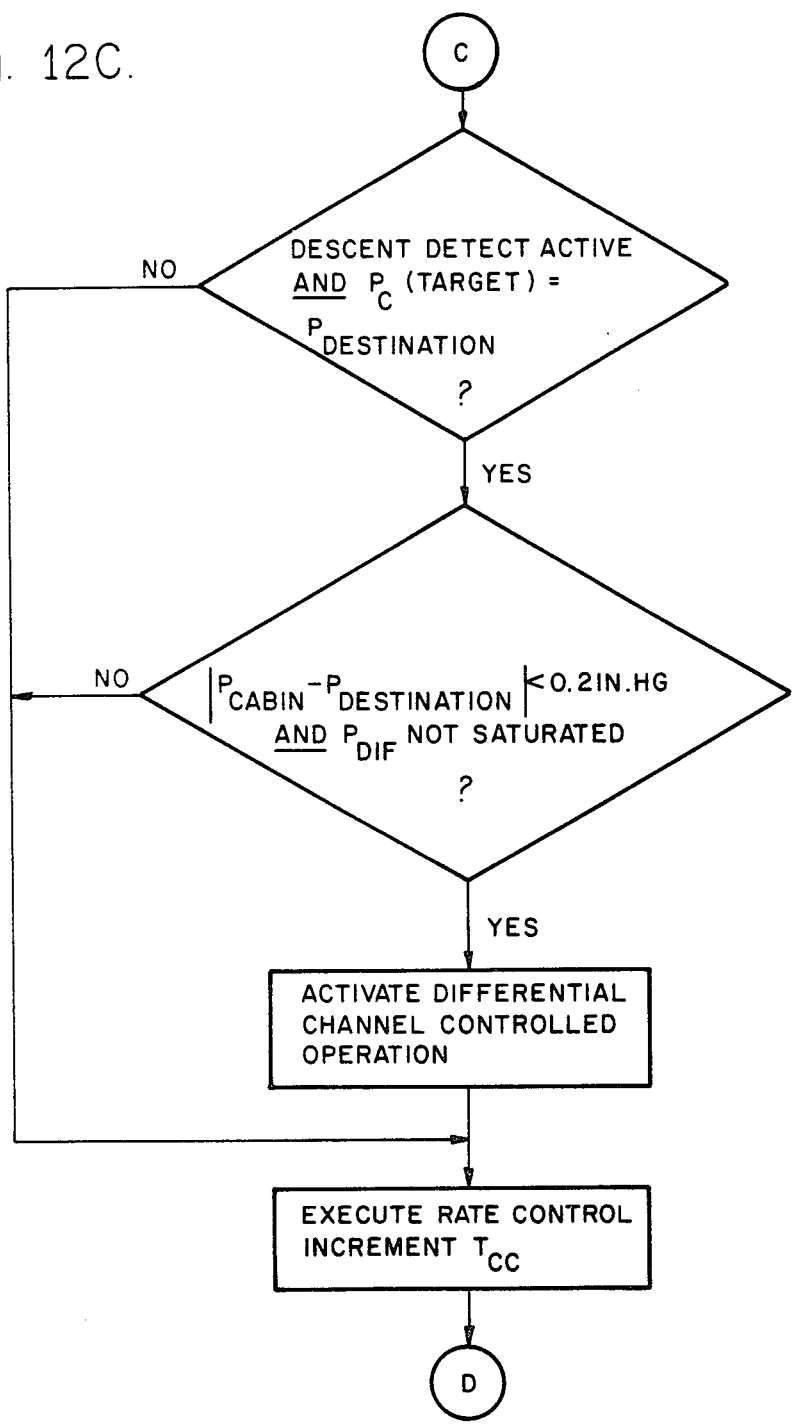
Figure 12D:
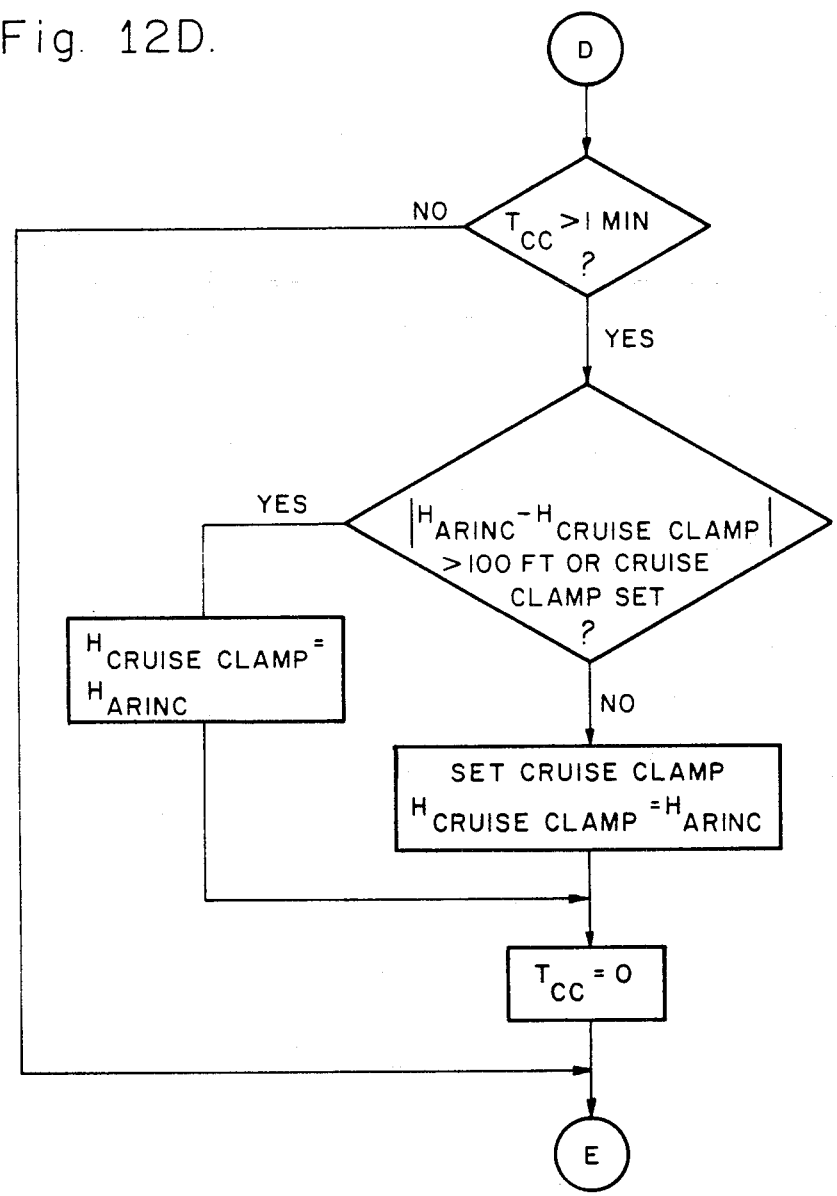

FIG. 11 is a flow diagram of the takeoff mode of central processing unit 54.

The auto-flight mode is entered whenever a NO-WOW signal is sensed. Upon initial entry into the auto-flight mode, the cruise clamp flag is in the zero state and the destination cabin pressure, $P_{destination}$, is set to the existing cabin pressure. Central processing unit 54 receives information from air data receiver 116 for setting $H_{maxdd}$ and $H_{cruise-clamp}$, which serve in descent detection and cruise-clamp determining roles, respectively to the value of the takeoff field pressure as shown in FIG. 12.

During the auto-flight mode, $H_{maxdd}$ registers the peak value of the aircraft pressure altitude provided by air data receiver 116. When the aircraft altitudes falls to a level 500 feet below the peak value registered by $H_{maxdd}$, the descent detect flag is set and central processing unit 54 enters the descent mode of control. Central processing unit remains in the descent mode for the duration of the flight. Central processing unit 54 computes the differences between the pressure altitude and the value of $H_{cruise-clamp}$ once per minute. If that difference exceeds the predetermined valve $H_{cruise-clamp}$ is assigned the value of the pressure altitude. If the difference is less or equal to the predetermined feet, the cruise-clamp condition becomes effective. Once central processing unit 54 calls the cruise-clamp, $H_{cruise-clamp}$ is clamped to the existing value thereof. The cruise-clamp condition will persevere until the aircraft pressure altitude goes a predetermined distance above or below the value of $H_{cruise-clamp}$.

Upon initial entry into auto-flight, the destination pressure is set to the existing cabin pressure. If a power failure occurs during the auto-flight mode, the measured cabin pressure upon power-up initialization is stored as the destination pressure. During the auto-flight mode, if either descent detect, manual destination, or cruise-clamp have been established, central processing unit 54 changes the destination pressure to the barometrically corrected landing field altitude pressure. Central processing unit 54 calculates the landing field altitude $H_{LFA}$ from the signal $P_{LIN}$ input into channel 2 of multiplexer 56.

Central processing unit 54 reads the aircraft altitude by means of inputs received from air data receiver 116 and determines the cabin pressure as a function of that altitude and the flight status. There are two schedules incorporated in central processing unit 54 in the automatic flight mode. As long as the descent detect flag has not been activated, an ascent schedule will be chosen and implemented. When the cruise descent detect flag is set, central processing unit 54 enters the descent schedule. When the cruise-clamp is set, the scheduled pressure value is clamped and remains constant until the cruise clamp is released. Central processing unit 54 compares the determined pressure value to the destination pressure after calculating the scheduled cabin pressure and taking into account the cruise-clamp status. Central processing unit 54 assigns to the target cabin pressure $P_c$ target the lower value of the determined pressure and the destination pressure.

When the aircraft approaches the landing field central processing unit 54 implements a special homing in routine to enable an improved accuracy in controlling the cabin air pressure to the actual landing field pressure. The homing in routine is activated if the cabin pressure target is the destination field pressure and the descent detect mode is in effect. Under the foregoing conditions, central processing unit 54 controls the cabin pressure to the landing field pressure. Central processing unit 54 enters the homing in mode when the absolute value of the difference between the cabin pressure, $P_c$ and the barometrically corrected landing field pressure, $P_{LDG}$ actual, falls to less than 0.2 inches of mercury and the input $P_{DIF}$ to channel 1 of multiplexer 56 is in the range of 0.1 to 9.9 volts. In the homing in mode central processing unit 54 calculates the pressure as a function of the input to channel 1 of multiplexer 56 and the actual pressure at the landing field altitude.

Figure 13A:
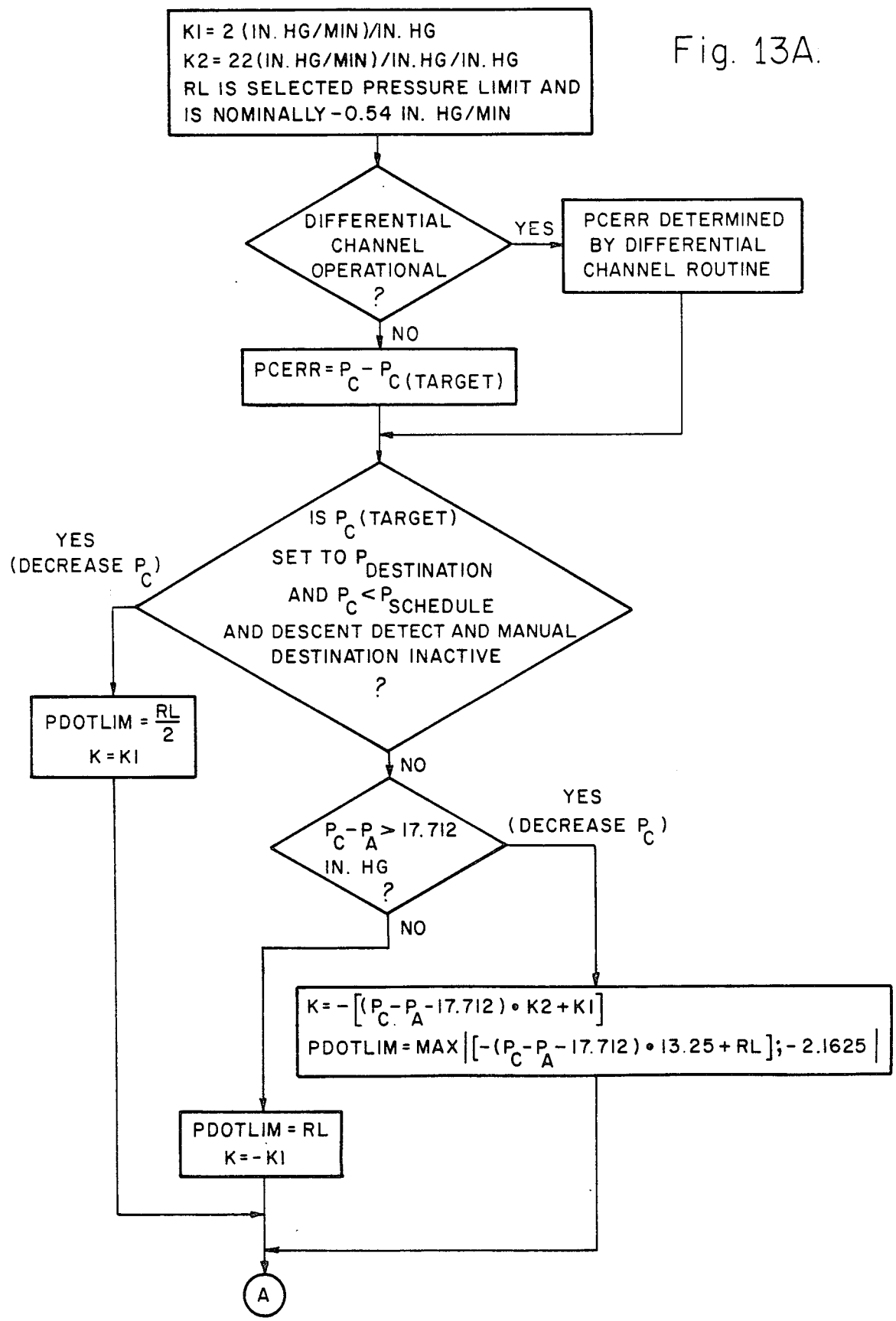
FIGS. 13A and 13B are auto-flight pressure rate control flow diagrams.
Figure 13B:
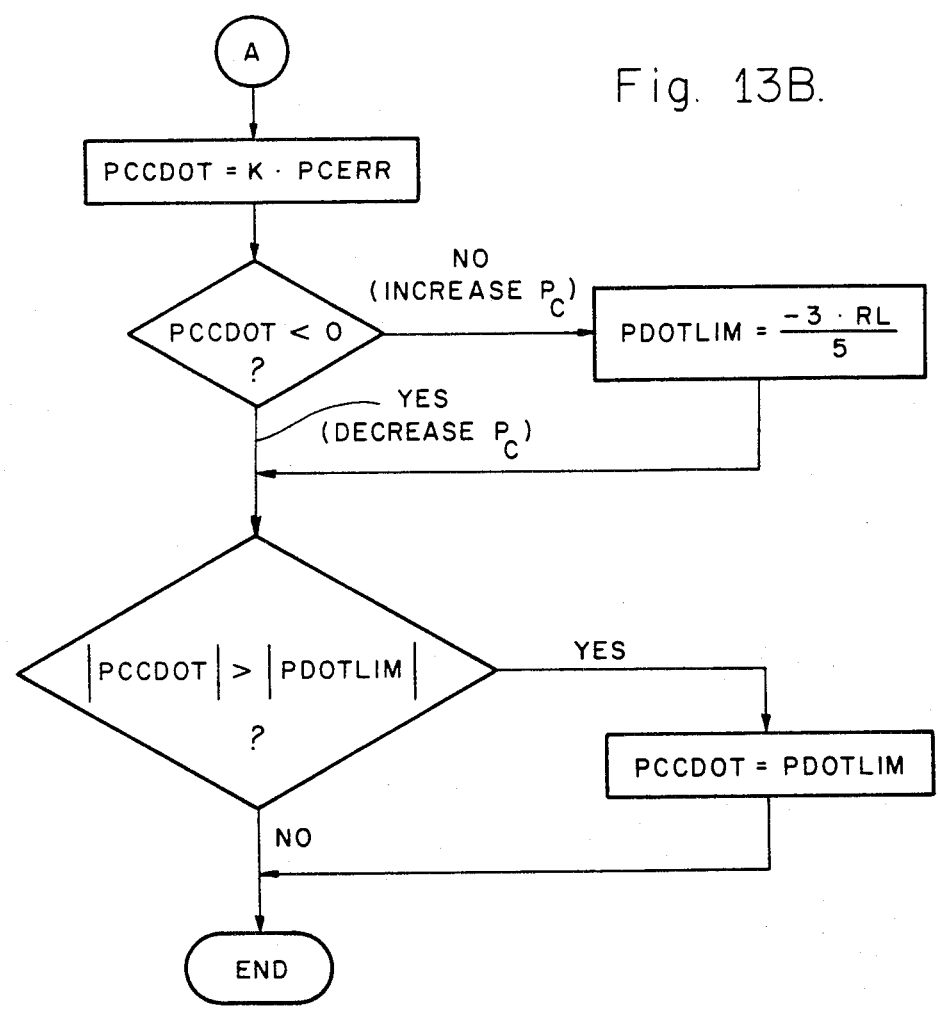

Referring FIGS. 13A and B the pressure rate control determines the commanded rate of change of cabin pressure. Central processing unit 54 calculates a pressure error function, PCERR which is equal to $P_c - P_c$ $P_{target}$ where $P_c$ is the cabin pressure whenever central processing unit 54 is not in the homing in mode. When the homing in mode is operative, PCERR is determined thereby. Central processing unit 54 reads the selected pressure rate limit, RL through the rate select signal applied to channel 3 of multiplexer 56.

Figure 14:
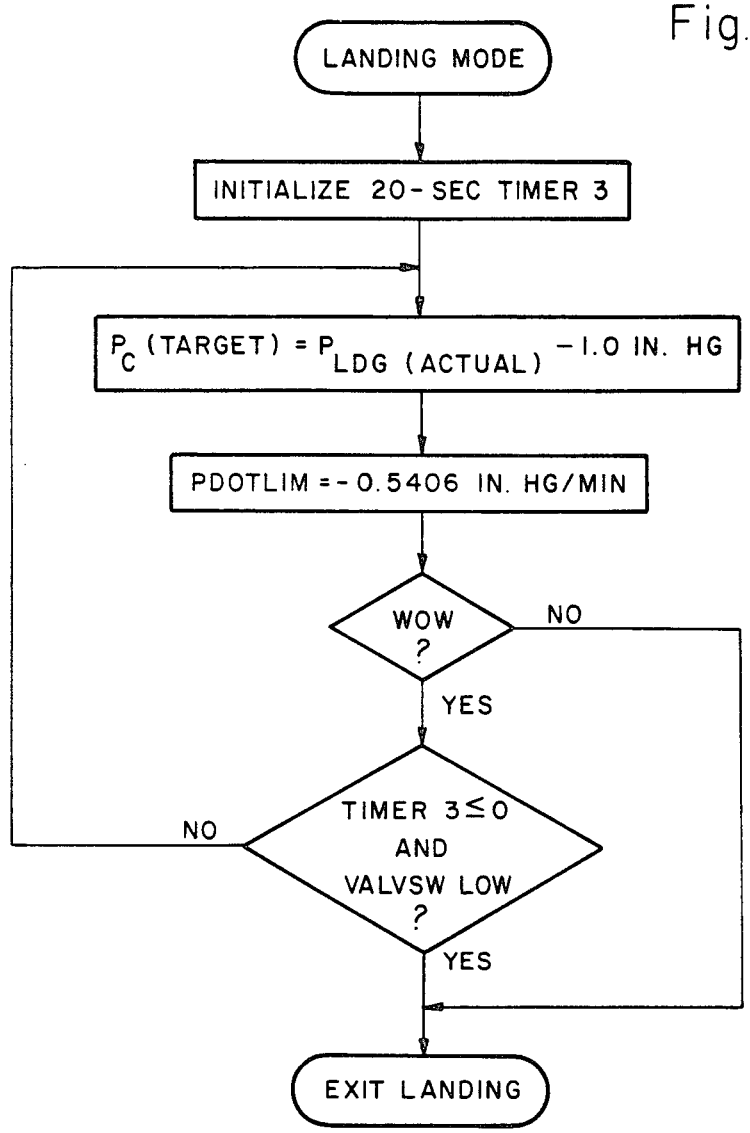
FIG. 14 is a landing mode flow diagram.

FIG. 14 is a flow chart of the landing mode.

Figure 15A:
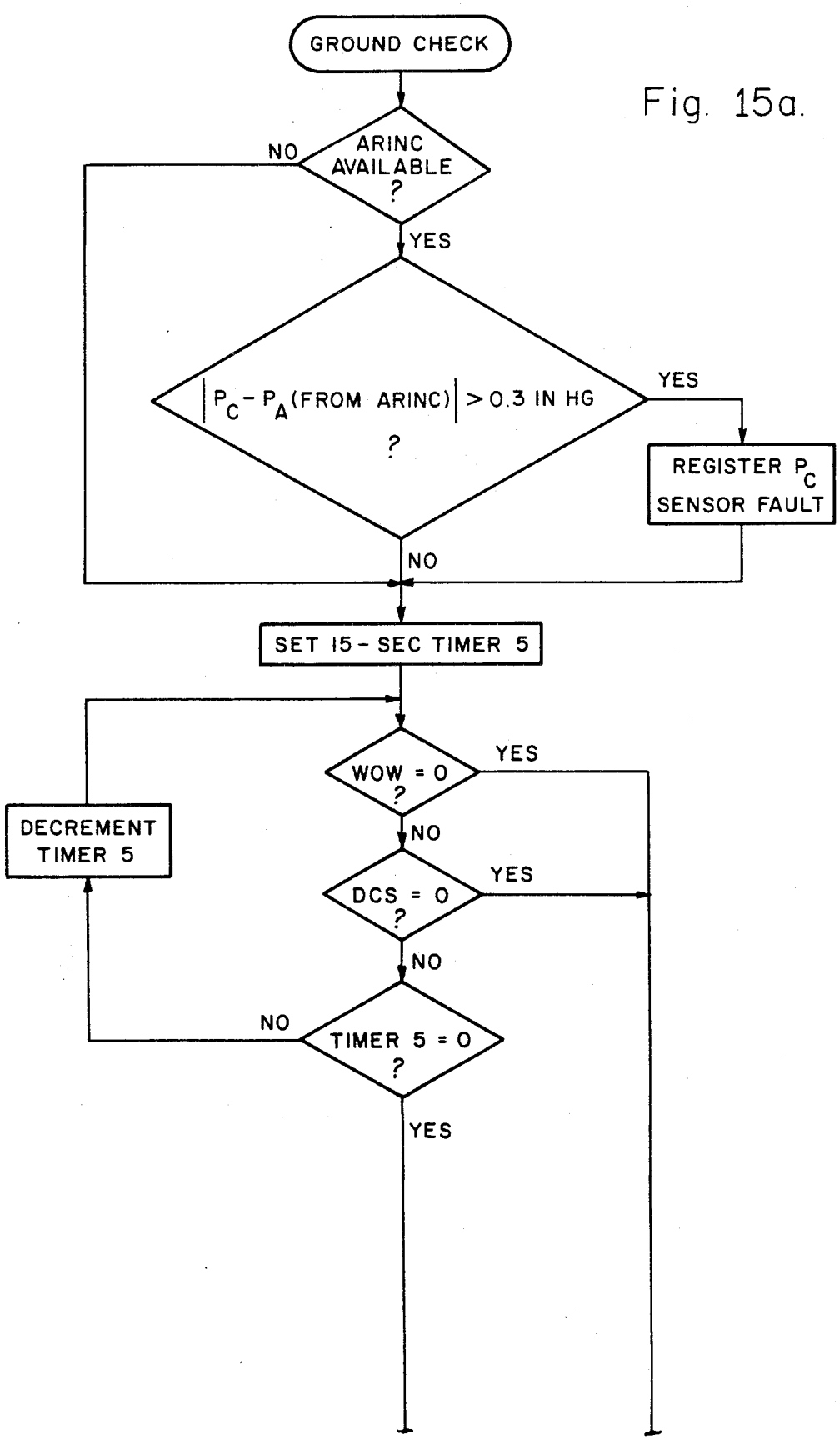
FIG. 15, shown in two parts as FIGS. 15a and 15b, is a ground mode flow diagram.
Figure 15B:
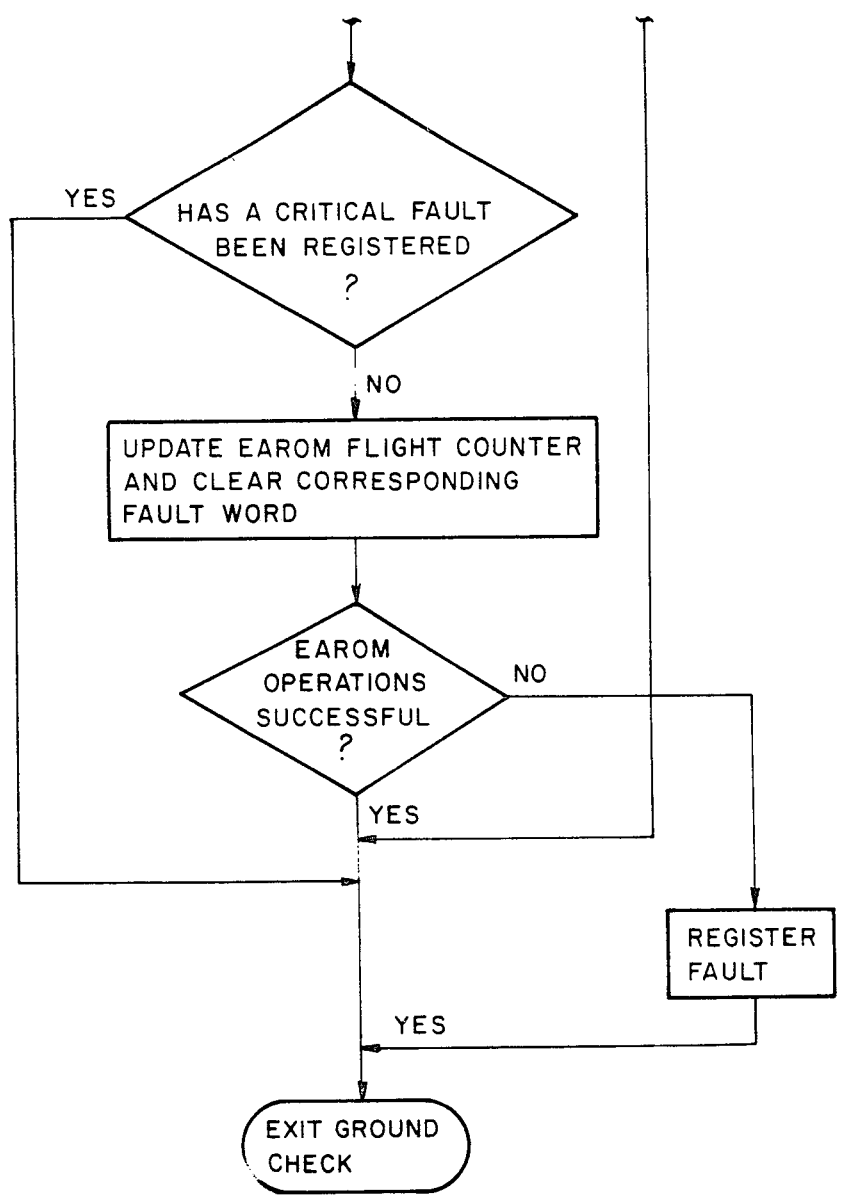

Referring to FIGS. 15a and 15b, upon entry into the ground check mode, central processing unit 54 compares the measured cabin air pressure to the pressure altitude supplied by air data receiver 116; and if these pressures differ by more than 0.3 inches of mercury, a fault is flagged. If no critical faults exist, central processing unit enters the ground mode. If the weight-on wheels signal goes low, central processing unit 54 enters the flight mode.

Figure 16A:
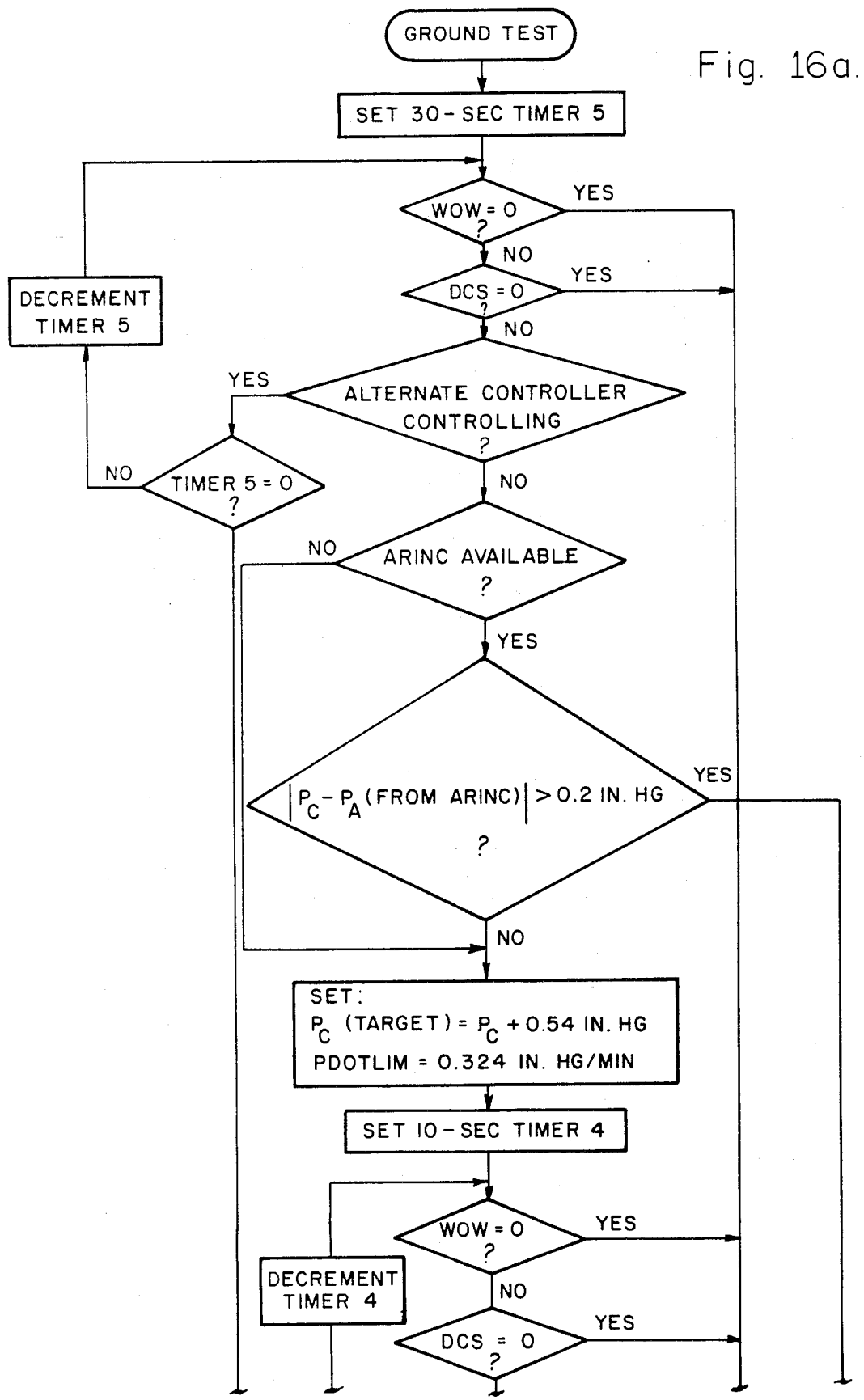
FIG. 16, shown in two parts as FIGS. 16a and FIG. 16b, is a ground test flow diagram.
Figure 16B:
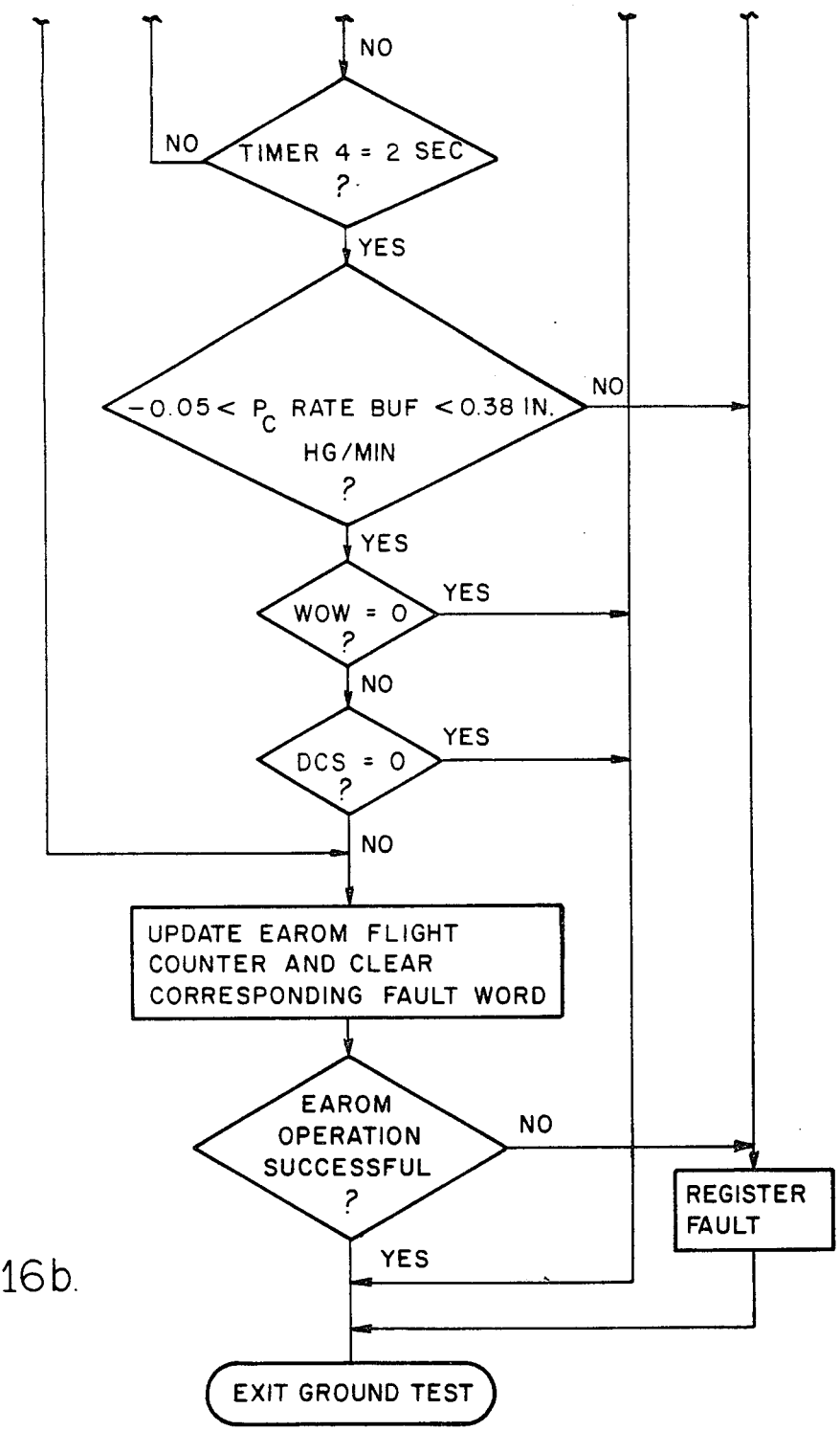

FIGS. 16a and 16b is a flow diagram of the ground test mode.

What is claimed is:

1. A system for controlling cabin pressurization in an aircraft cabin, comprising:
   first means for providing a cabin altitude signal indicative of the air pressure in said aircraft cabin;
   second means for providing a cabin altitude rate change signal indicative of the actual rate of change of air pressure in said aircraft cabin;
   third means for providing an aircraft altitude signal indicative of the ambient air pressure on the exterior of the aircraft, and hence the altitude of the aircraft;
   autoschedule means for calculating a commanded rate of change of air pressure in said aircraft cabin in response to aircraft altitude;
   means for controlling the air pressure in said aircraft cabin in response to said cabin altitude signal and said commanded rate of change; and
   clamp control means for maintaining a constant pressure situation in said aircraft cabin, said constant pressure situation being initiated when the change of said aircraft altitude signal over a preset time period is less than a first predetermined value, said constant pressure situation being maintained until said aircraft altitude signal changes by a second predetermined value from the value of said aircraft altitude signal at the time said constant pressure situation was initiated.

2. A system as defined in claim 1, wherein said first means comprises:
   a pressure transducer located in said aircraft cabin.

3. A system as defined in claim 1, wherein said cabin altitude rate change signal provided by said second means is proportional to the rate of change of said cabin altitude signal.

4. A system as defined in claim 1, wherein said third means comprises:
   a pressure transducer located on the exterior of the aircraft.

5. A system as defined in claim 1, wherein said autoschedule means comprises:
   computing means;
   means connected to said computing means for inputting said cabin altitude signal, said cabin altitude rate change signal, and said aircraft altitude signal, said computing means being programmed to compute said commanded rate of change of air pressure in said aircraft cabin to maintain a predetermined scheduled relationship between air pressure in said aircraft cabin and ambient air pressure; and
   means for supplying output signals from said computing means to said maintaing means.

6. A system as defined in claim 5, further comprising:
   air data receiver means for receiving and storing signals indicative of flight data, said air data receiving means outputting a receiver full signal after storing flight data signals; and
   an OR date connected to said air data receiver, said OR gate being responsive to the receiver full signal to supply an interrupt signal to said computing means for interrupting operation thereof to cause said computing means to read air data signals stored in said air data receiver.

7. A system as defined in claim 5 wherein said means for supplying output signals from said computing means comprises:
   a digital-to-analog converter connected to an output of said computing means;
   a sample-and-hold circuit connected to an output of said digital-to-analog converter; and
   address decoder means connected to an output of said computing means for selectively applying a trigger signal to said sample-and-hold circuit to cause said sample-to-hold circuit to sample-and-hold the output of said digital-to-analog converter whenever the output thereof is a commanded rate of change of air pressure signal.

8. A system as defined in claim 7, further comprising:
   rate amplifier means for amplifying said cabin altitude rate change signal;
   a first summing circuit having a first input connected to said means for amplifying said cabin altitude rate change signal and;
   a second input of said first summing circuit which is connected to said sample-and-hold circuit, said first summing circuit producing an output which is a function of the difference between the actual and commanded rates of change of air pressure within said aircraft cabin.

9. A system as defined in claim 5, wherein said predetermined scheduled relationship is designed for an aircraft type based on the lowest cabin altitude rate compatible with the maximum design aircraft climb rate while the aircraft is climbing to maximum altitude.

10. A system as defined in claim 5, wherein said controlling means comprises:
    means for producing a pressure rate error signal which is a function of the difference between the actual and commanded rates of change of air pressure in said aircraft cabin; and
    means responsive to said pressure rate error signal for regulating flow of air through said aircraft cabin to maintain the air pressure within said aircraft cabin and said actual rate of change of air pressure to predetermined values.

11. A system as defined in claim 10 wherein said means responsive to said pressure rate error signal for regulating flow of air through said aircraft cabin comprises:
    an outflow valve;
    an actuator motor connected to said outflow valve;

means for supplying electrical energy to said actuator motor; and means for controlling application of electrical energy to said actuator motor to control the position of said outflow valve.

12. A system as defined in claim 11 further comprising:

tachometer means for providing a signal indicative of the speed of said actuator motor;

a first summing circuit for producing an output which is a function of the difference between the actual and commanded rates of change of air pressure within said aircraft cabin; and a second summing circuit having a first input connected to said first summing circuit and a second input connected to said tachometer means for receiving the actuator motor speed signal therefrom, said second summing circuit producing a speed error output signal proportional to the difference of the rate error signal and the actuator motor speed signal.

13. A system as defined in claim 11 wherein said means for supplying electrical power to said actuator motor includes:

a source of electrical power;

a relay connected between said source of electrical power and said actuator motor; and logic circuitry controlled by said computing means for switching said relay between an energized position and a deenergized position for selectively applying electrical power to said actuator motor.

14. A system as defined in claim 12 wherein said means for controlling application of electrical energy to said actuator motor comprises:

an error amplifier connected to the output of said second summing circuit to produce a motor drive signal;

a first threshold circuit connected to said error amplifier, said first threshold circuit producing an output signal for driving said outflow valve open whevever the motor drive signal exceeds a predetermined value; and a second threshold circuit connected to said error amplifier, said second threshold circuit producing an output signal for driving said outflow valve closed whenever the motor drive signal is less than a predetermined value.

15. A system according to claim 14 further including:

a first AND gate having a first input connected to the output of said first threshold circuit and a second input connected to said computing means to receive an enabling signal therefrom; and a second AND gate having a first input connected to said second threshold circuit and a second input connected to said computing means to receive an enabling signal therefrom.

16. A system as defined in claim 1, wherein the value of pressure maintained constant in said aircraft cabin is set to the value of pressure in said aircraft cabin at the time said constant pressure situation is initiated.

17. A system as defined in claim 1, wherein said commanded rate of change of air pressure in said aircraft cabin is set at zero at the time said constant pressure situation is initiated.

18. A system as defined in claim 17, wherein at such time as said constant pressure situation ceases to be maintained due to deviation in aircraft altitude by said second predetermined value, commanded rate of change of air pressure in said aircraft cabin returns to the value set by said autoschedule means.

19. A system as defined in claim 1, further comprising:

means for entering the altitude of the landing field, said autoschedule means calculating said commanded rate of change on descent with the pressure associated with said landing field altitude as a target for said autoschedule means.

20. A system as defined in claim 19, wherein said autoschedule means begins a descent mode when said aircraft descends at a third predetermined value.

21. A system as defined in claim 20, wherein said third predetermined value is 1000 feet per minute.

22. A system as defined in claim 1, wherein said second predetermined value is ±500 feet.

23. A system as defined in claim 1, wherein said first predetermined value is 500 feet in a two minute period.

24. A system as defined in claim 1, further comprising:

means for limiting the differential between said cabin altitude signal and said aircraft altitude signal, said limiting means overriding said autoschedule means to prevent excessive pressure differential between said aircraft cabin and the ambient air outside said aircraft.

25. A system as defined in claim 1, further comprising:

means for setting maximum pressure rate changes manually;

means for comparing maximum pressure rate changes entered manually by said setting means with the commanded rate of change calculated by said autoschedule to determine the smaller rate change; and means for substituting a maximum pressure rate change for said commanded rate of change if said maximum pressure rate change is smaller.

26. A method for controlling air pressure in an aircraft cabin, comprising:

sensing air pressure in said aircraft cabin;

generating a signal indicative of the actual rate of change of air pressure in said aircraft cabin;

measuring ambient pressure on the exterior of the aircraft to provide an indication of the altitude of said aircraft;

calculating a commanded rate of change of air pressure in said aircraft cabin in response to aircraft altitude;

controlling the air pressure in said aircraft cabin in response to said cabin altitude signal and said commanded rate of change;

initiating a constant pressure situation in said aircraft cabin when aircraft altitude varies by less than a first predetermined values over a preset time period; and maintaining air pressure in said aircraft cabin constant during said constant pressure situation by clamping said air pressure in said aircraft cabin to a constant value.

27. A method as defined in claim 26, wherein said constant value is the air pressure in said aircraft cabin at the time said constant pressure is initiated.

28. A method as defined in claim 26, additionally comprising:

ending said constant pressure when the altitude of said aricraft changes by a second predetermined value from the value of said aircraft altitude at the time said constant pressure is initiated.

29. A method as defined in claim 26, additionally comprising:
  entering the altitude of the landing field before take-off;
  comparing the altitude of said aircraft with altitude of said landing field; and
  bypassing said calculating step if said comparing step indicates landing field altitude is higher than the altitude of said aircraft, and commanding air pressure in said aircraft cabin to decrease at a constant rate until air pressure in said aircraft cabin is approximately the same as air pressure at said landing field.

* * * * *